United States Patent [19]

Hasushita et al.

[11] Patent Number: 5,434,636
[45] Date of Patent: Jul. 18, 1995

[54] REAL IMAGE TYPE VIEW FINDER

[75] Inventors: Sachio Hasushita; Takayuki Ito, both of Tokyo, Japan

[73] Assignee: Asahi Kogaku Kogyo Kabushiki Kaisha, Tokyo, Japan

[21] Appl. No.: 182,502

[22] Filed: Jan. 18, 1994

[30] Foreign Application Priority Data

Jan. 18, 1993 [JP] Japan .................. 5-006247

[51] Int. Cl.⁶ .............................................. G03B 13/02
[52] U.S. Cl. .................................. 354/219; 354/221; 359/432
[58] Field of Search ................ 354/219, 221, 222, 224, 354/225; 359/422, 432, 676

[56] References Cited

U.S. PATENT DOCUMENTS

| | | | |
|---|---|---|---|
| 4,842,395 | 6/1989 | Sato et al. | 359/380 |
| 4,926,201 | 5/1990 | Mukai et al. | 354/219 |
| 4,969,723 | 11/1990 | Kato et al. | 359/423 |
| 5,034,763 | 7/1991 | Inabata | 354/219 |
| 5,052,787 | 10/1991 | Sugawara | 359/683 |
| 5,086,353 | 2/1992 | Mukai et al. | 359/432 |
| 5,095,326 | 3/1992 | Nozaki et al. | 354/222 |
| 5,117,247 | 5/1992 | Nakai et al. | 354/222 |
| 5,132,838 | 7/1992 | Ohshita | 359/432 |
| 5,144,349 | 9/1992 | Kato et al. | 354/222 |
| 5,191,477 | 3/1993 | Abe et al. | 359/695 |

FOREIGN PATENT DOCUMENTS

| | | |
|---|---|---|
| 1-166024 | 6/1989 | Japan . |
| 1-257817 | 10/1989 | Japan . |
| 1-309019 | 12/1989 | Japan . |
| 3-25422 | 2/1991 | Japan . |
| 868200 | 5/1961 | United Kingdom . |
| 1295214 | 11/1972 | United Kingdom . |
| 2092327 | 8/1982 | United Kingdom . |
| 2251956 | 7/1992 | United Kingdom . |

*Primary Examiner*—Howard B. Blankenship
*Attorney, Agent, or Firm*—Sandler, Greenblum & Bernstein

[57] ABSTRACT

A real image type of view finder including a positive objective lens group, a positive condenser lens group, an image erecting optical system which erects an inverted image formed by the objective lens group and the condenser lens group, and an eyepiece lens group through which the erected image can be observed. The condenser lens group is spaced at a predetermined distance from an image forming plane in the direction of the objective lens group. The inverted image is formed on the image forming plane.

16 Claims, 20 Drawing Sheets

REAL IMAGE TYPE VIEW FINDER

BACKGROUND OF THE INVENTION

1. Field of the Invention

The present invention relates to a real image type view finder.

2. Description of Related Art

In a conventional real image type of view finder, an inverted image, which is formed by a positive objective lens group and a positive condenser lens group, is erected by an image erecting optical system so that the erect image can be viewed through a positive ocular lens group (i.e., eyepiece group). The condenser lens group is usually located in the vicinity of the focal position of the objective lens group. Consequently, the condenser lens group contributes little to the formation of an inverted image. Formation of the primary image (i.e., primary convergence) is mainly effected by the objective lens group. The condenser lens group has little power to form the primary image. Consequently, it is difficult to correct an aberration of the image formed by the primary convergence, particularly in recent compact cameras having a small view finder with high power variation.

In a camera having a view finder separate from a photographing optical system, the parallax error between the view finder and the photographing optical system must be corrected upon assembly, so that parallax error does not occur at a specific object distance (i.e., reference object distance). There are various known parallax correcting mechanisms. For example, in a conventional real image type view finder, parallax error correction is carried out by the adjustment of an angle of a mirror provided within the objective lens group. In the angular adjustment of the mirror, the field of view within a plane including the optical axis of light incident upon the mirror and the optical axis of light reflected by the mirror and, accordingly, the reflection angle of the reflected light can be adjusted, but if the light is out of the plane, an inclination of the image takes place.

Furthermore, it is also known to execute parallax compensation by the adjustment of the displacement of the field frame. However, in this parallax error compensation system, a prism which constitutes the image erecting optical system must be large enough to entirely cover the adjustment range of the displacement the field frame, thus resulting in a large view finder.

SUMMARY OF THE INVENTION

It is an object of the present invention to provide a small and simple view finder in which aberration correction can be precisely effected even in a camera having a high power variation.

Another object of the present invention is to provide a view finder in which parallax error compensation can be easily and precisely carried out upon assembly.

According to the present invention, there is provided a real image type of view finder comprising a positive objective lens group, a positive condenser lens group and an image erecting optical system which erects an inverted image formed by the objective lens group and the condenser lens group. An eyepiece lens group is also provided, through which the erected image can be observed. The condenser lens group is spaced from an inverted image forming plane at a predetermined distance to come close to the objective lens group.

The present disclosure relates to subject matter contained in Japanese patent application No. 5-6247 (filed on Jan. 18, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
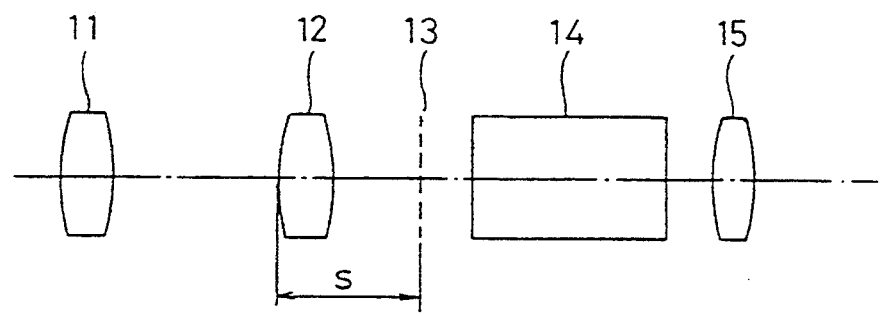
FIG. 1 is a conceptual view of a real image type of view finder according to the present invention.

FIG. 1 shows the simplest lens layout of a real image type of view finder, in which an inverted image is formed by a positive objective lens group 11 and a positive condenser lens group 12 at a primary image formation plane 13. The inverted image is then erected by an image erecting optical system 14 comprised of a Porro prism, a mirror or mirrors, etc. The erect image can be observed through a positive eyepiece group 15. The condenser lens group 12 is spaced from the primary image formation plane 13 at a distance "s".

In the arrangement illustrated in FIG. 1, the condenser lens group 12, which is spaced from the primary image formation plane 13, shares the burden (i.e., contributes to the power) of the objective lens group 11 to form the inverted image. Namely, both the condenser lens group 12 and the objective lens group 11 contribute to the formation of the inverted image. This facilitates aberration correction.

Figure 2:
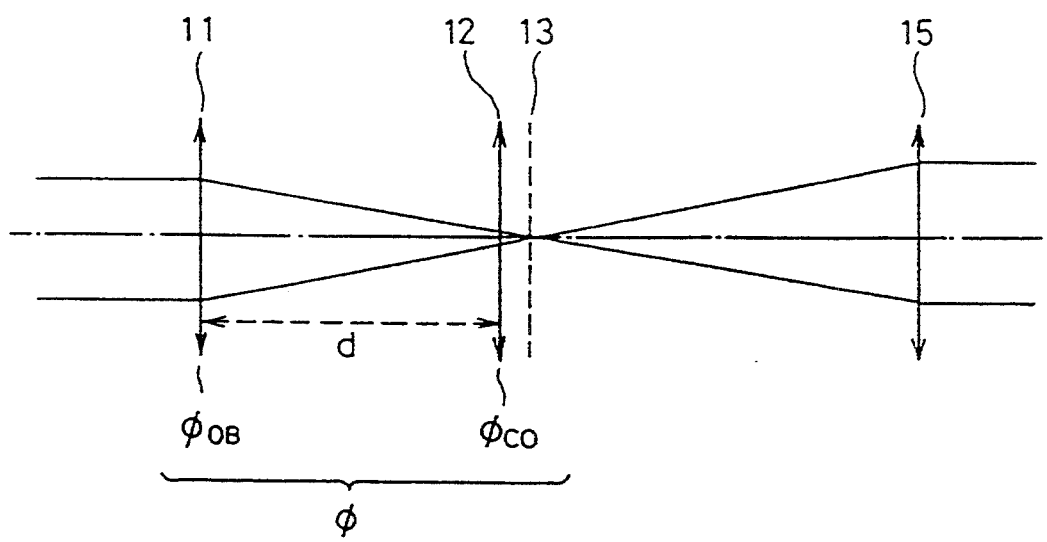
FIG. 2 is a schematic diagram showing powers of lens groups in a real image type of view finder according to the present invention.

FIG. 2 shows the shared powers of the objective lens group 11 and the condenser lens group 12. Referring to FIG. 2, the resultant power $\phi$ of the objective lens group 11 and the condenser lens group 12 is given by:

$$\phi = \phi_{OB} + \phi_{CO} - \phi_{OB} \cdot \phi_{CO} \cdot (1/d)$$

wherein $\phi_{OB}$ designates the power of the objective lens group 11; $\phi_{CO}$ the power of the condenser lens group 12; and, "d" the distance between the objective lens group 11 and the condenser lens group 12, respectively.

In the prior art, $\phi \approx \phi_{OB}$, since $d \approx 1/\phi_{OB}$.

Whereas, in the present invention, since $d < 1/\phi_{OB}$, $\phi > \phi_{OB}$.

As can be seen from the foregoing, not only the objective lens group 11, but also the condenser lens group 12 contributes to the formation of the primary image.

The objective lens group 11 is comprised of negative and positive movable lens groups that are movable in the optical axis direction and that are located in this order from the object side to constitute a variable power optical system to vary the power (i.e., magnification) of the view finder.

Figure 3:
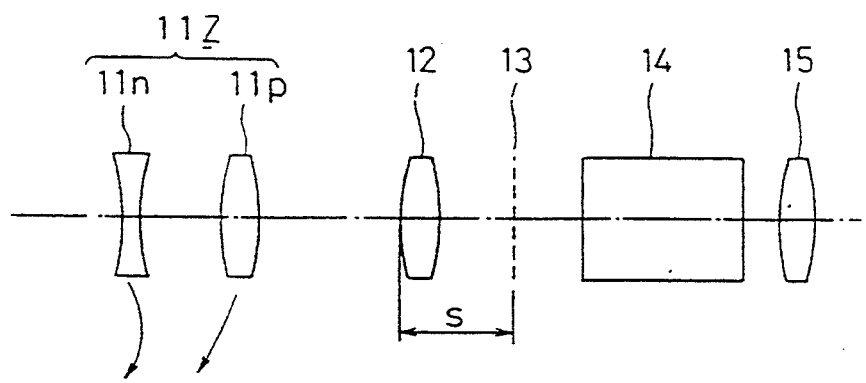
FIG. 3 is a conceptual view of a variable power view finder realized by a real image type of view finder according to the present invention.

In the simplest structure shown in FIG. 3, the variable power objective lens group 11Z comprised of a negative movable lens group 11n and a positive movable lens group 11p is used in place of the objective lens group 11. Other structure in FIG. 3 is the same as FIG. 1.

The distance of the condenser lens group 12 from the image formation plane 13 is preferably selected to satisfy the following relationship;

$$0.65 < s/f_{OW} < 1.2 \ .$$

wherein "s" designates the reduced distance between the image formation plane 13 and the first lens surface (object side) of the condenser lens group 12; and, "$f_{OW}$" the resultant focal length of the objective lens group 11 and the condenser lens group 12. "Reduced distance" is (d/n) wherein "d" represents a distance that a ray travels in a medium; and "n" the refractive index of the medium. In the case of the variable power objective lens group 11Z, "$f_{OW}$" designates the resultant focal length of the shortest focal length thereof and the focal length of the condenser lens group 12.

If the value of $s/f_{OW}$ is below 0.65, the distance between the primary image formation plane and the condenser lens group 12 is too small to achieve the object of the present invention. Conversely, if the value of $s/f_{OW}$ is above 1.2, the distance of the condenser lens group 12 is too far from the primary image formation plane. Accordingly, the power is concentrated on the condenser lens group. Hence, it is difficult to correct the aberrations within the condenser lens group. In the case of the variable power finder, little or no displacement of the condenser lens group necessary to vary the power (i.e., magnification), can be gained.

Preferably, a transparent plane-parallel plate 16 is provided at the primary image formation plane, so that one of the surfaces thereof lies in the primary image formation plane. If the view finder of the present invention is applied to a camera, it is possible to provide or draw a mark which represents an automatic focus detecting zone and/or a parallax compensation mark which is adapted to correct the parallax error between the optical axis of the photographing optical system and the optical axis of the view finder at a close object distance, etc., on the surface of the plane-parallel plate that lies in the primary image formation plane.

Figure 4A:
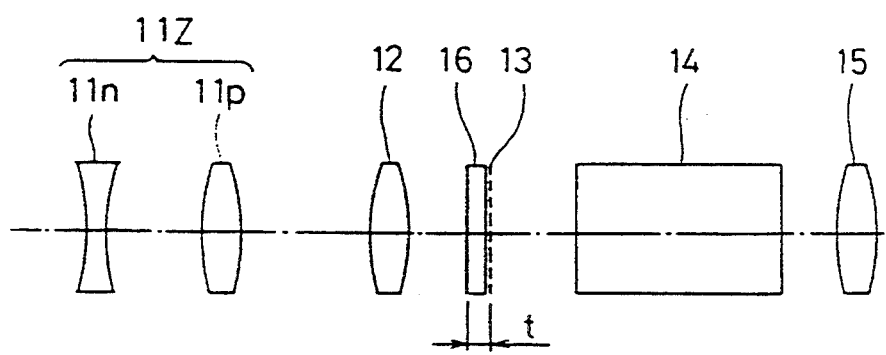
FIGS. 4A and 4B show two different arrangements of optical elements in a real image type of view finder shown in FIG. 3, wherein a plane-parallel plate is located at a primary image formation plane of the view finder.
Figure 4B:
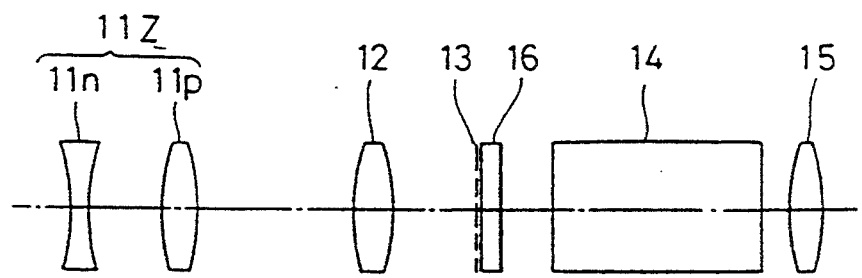

FIGS. 4A and 4B show two examples of the arrangement of the plane-parallel plate 16, in which the rear surface and front surface of the latter lie in the primary image formation plane 13, respectively.

The reduced thickness "t" of the plane-parallel plate 16 preferably satisfies the following relationship;

$$t/f_e > 0.07$$

wherein "$f_e$" designates the focal length of the eyepiece group 15. "Reduced thickness" is (1/n) wherein "1" represents the length of a distance that a ray travels in a medium; and "n" the refractive index of the medium.

If the reduced thickness "t" of the plane-parallel plate 16 satisfies the relationship above, a diopter (or position) of foreign matter applied to the surface of the plane-parallel plate other than the surface thereof that lies within the primary image formation plane 13 is deviated from the diopter (or position) of the inverted image formed by the primary convergence and the field frame, so that the foreign matter is not conspicuous. Namely, the diopter difference $\Delta$dpt is given by the following equation;

$$\Delta dpt = 1000 \times \Delta d / f_e^2$$

wherein $\Delta$d is the distance between the primary image formation plane 13 (i.e., field frame) and the surface on which the foreign matter is applied.

Accordingly, if the thickness of the plane-parallel plate 16 is selected with respect to the focal length $f_e$ of the eyepiece group as mentioned above, the applied foreign matter becomes inconspicuous. Foreign matter applied to the surface of the plane-parallel plate 16 adjacent to the primary image formation plane 13 is not discussed in the present invention.

If at least one lens surface of the condenser lens group is an aspherical surface, the aberration within the condenser lens group would be more effectively reduced.

As mentioned above, there is a space between the condenser lens group 12 and the primary image formation plane 13. According to another aspect of the present invention, a field flattening element (i.e., field flattener) is provided in the space between the condenser lens group 12 and the primary image formation plane 13 to correct the curvature of the field caused by the objective lens group and the condenser lens group. The aberration can be more effectively eliminated by the field flattener.

If the real image type view finder having a high power variation is miniaturized, the positive powers of the objective lens group (i.e., positive lens group in case of a variable power finder) and the condenser lens group are increased. Accordingly, the Petzval sum increases in the positive direction, particularly at a large magnification in the case of the variable power finder, resulting in a large curvature of field at the peripheral portion of the field of view. The field flattener located in the vicinity of the primary image formation plane can correct the curvature of the field without causing aberrations. In particular, if the field flattener has a negative power, the Petzval sum can be easily reduced. Alternatively, even if the field flattener has a small positive power, curvature of field can be corrected by the use of an aspherical lens surface.

Figure 5:
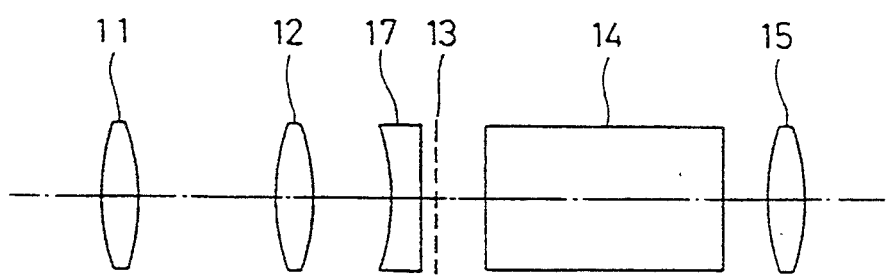
FIG. 5 is a conceptual view of a real image type of view finder which is additionally provided with a field flattening device ( i.e., field flattener) in comparison with the view finder shown in FIG. 1.

FIG. 5 shows an embodiment in which the field flattener 17 is provided, in addition to the optical elements shown in FIG. 1. The field flattener 17 is located between the condenser lens group 12 and the primary image formation plane 13.

Preferably, the field flattener 17 satisfies the following relationship;

$$-0.7 < f_{CO}/f_{FF} < 0$$

wherein $f_{CO}$ designates the focal length of the condenser lens group, and $f_{FF}$ the focal length of the field flattener, respectively.

If the value of $f_{CO}/f_{FF}$ is below $-0.7$, there is an over correction of the curvature of field. Conversely, if the value of $f_{CO}/f_{FF}$ is above 0, the field flattener becomes a positive lens, and if no aspherical lens surface is used, curvature of field would not be completely corrected.

If the field flattener is made of an aspheric lens having a negative power at the peripheral edge portion thereof, the value of $f_{CO}/f_{FF}$ satisfies the following relationship;

$$-0.7 < f_{CO}/f_{FF} < 0.3$$

If the value of $f_{CO}/f_{FF}$ is below $-0.7$, there is an over correction of the curvature of field. Conversely, if the value of $f_{CO}/f_{FF}$ is above 0.3, curvature of field would not be completely corrected, even if the correction is made by an aspherical lens having a negative power at the peripheral edge portion thereof.

The field flattener 17 is preferably provided with a substantially flat surface which lies within the primary image formation plane 13. Similar to the plane-parallel plate, it is possible to provide or draw an object distance mark which represents an automatic focus detecting zone and/or a parallax compensation mark which is adapted to correct the parallax error between the optical axis of the photographing optical system and the optical axis of the view finder at a close object distance, etc., on the flat surface of the field flattener.

Preferably, the reduced thickness "T" of the field flattener satisfies the following relationship;

$$T/f_e > 0.07$$

wherein "$f_e$" designates the focal length of the eyepiece group 15.

This is the same as the condition for the plane-parallel plate mentioned above. The criteria for the selection of threshold values is the same as that of the plane-parallel plate.

As discussed above, in the prior art, regarding the shared powers of the objective lens group 11 and the condenser lens group 12, the following relationship is satisfied:

$$\phi \fallingdotseq \phi_{OB}$$

wherein "$\phi$" designates a resultant power of the objective lens group 11 and the condenser lens group 12.

However, in the present invention, the following relationship is satisfied:

$$\phi > \phi_{OB}$$

wherein "$\phi$" designates a resultant power of the objective lens group and the condenser lens group and "$\phi_{OB}$" designates a power of the objective lens group itself. In the case that the focal length of the objective lens group varies, the above "$\phi$" designates a resultant power of the objective lens group and the condenser lens group at a smallest magnification and the above "$\phi_{OB}$" designates a power of the objective lens group itself at a smallest magnification. Specifically, it is preferable to satisfy the following relationship:

$$1.36 \leq \phi/\phi_{OB} \leq 1.8$$

In the case that the above value "$\phi/\phi_{OB}$" is below 1.36, the power of the objective lens group is excessively large as compared with that of the condenser lens, which will make it difficult to correct the aberration when the finder optical system need to be minimized or have a high variable power. According to the prior art, the above value "$\phi/\phi_{OB}$" is below 1.36. On the other hand in the case that the value "$\phi/_{OB}$" is above 1.8, the power of the condenser lens group is excessively large as compared with that of the objective lens group, which will make it o difficult to correct the aberration within the condenser lens system. The optimum shared powers of the objective lens group and the condenser lens group can be obtained and the correction of the aberration will be easily done if the following relationship is satisfied:

$$1.4 \leq \phi/\phi_{OB} \leq 1.7$$

Moreover, the inventors of the present invention have found that the sensitivity of the parallax error correction (i.e., displacement of the field of view) in which the condenser lens group is moved in directions normal to the optical axis is enhanced when the condenser lens group is spaced from the primary image formation plane. Taking this into account, another feature of the present invention is directed to the correction of the parallax error which might occur upon assembly.

Figure 6:
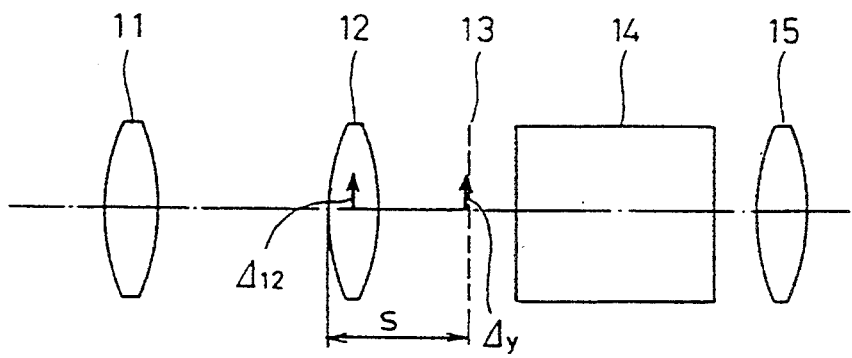
FIG. 6 is a schematic view of a parallax compensation sensitivity by a condenser lens group in a real image type of view finder shown in FIG. 1.

FIG. 6 shows the principle of parallax error correction according to the present invention. In FIG. 6, when the condenser lens group 12 is moved in the direction perpendicular to the optical axis by $\Delta_{12}$, the value $\Delta y$ of parallax to be adjusted, caused on the primary image formation plane 13 is given by;

$$\Delta y = (m' - m)\Delta_{12}$$

wherein "m" designates the resultant magnification by the condenser lens group 12 and the optical elements located between the condenser lens group and the primary image formation plane 13; and "m'" the resultant magnification by the optical elements located between the condenser lens group 12 and the primary image formation plane 13 which does not include condenser lens group 12, respectively.

The value of (m'−m) increases as the distance between the condenser lens group 12 and the primary image formation plane 13 increases. Namely, since the sensitivity of the parallax error correction increases, the parallax (i.e., field position) can be easily adjusted by the slight displacement (i.e., offset or decentering adjustment) of the condenser lens group 12 in the directions perpendicular to the optical axis. Consequently, little or no distortion or coma aberration occur due to the slight displacement of the condenser lens group.

The offset adjustment can be effected by a part of the condenser lens group if the latter is comprised of a plurality of lens groups. The lens group of the condenser lens group 12 to be displaced for offset adjustment is preferably provided with at least one aspheric lens surface, so that the distortion and the coma aberration, which would be otherwise caused by the offset adjustment thereof, can be restricted. If the variable power objective lens group 11Z is employed as the objective lens group 11, the offset adjustment thereof corrects the average parallax error within the variable power range.

Figure 7:
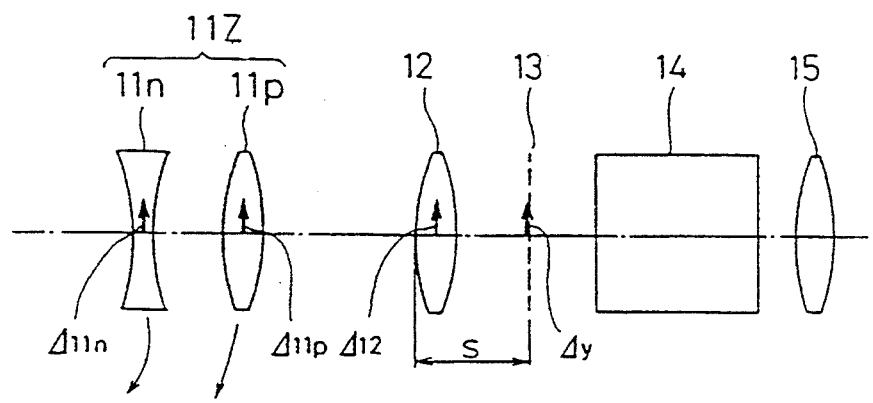
FIG. 7 is a schematic view of a parallax compensation sensitivity by an objective lens group and a condenser lens group in a real image type of view finder shown in FIG. 3.

If the variable power objective lens group 11Z is at least partially movable in the directions perpendicular to the optical axis, independent of the condenser lens group 12, parallax error at both low and high magnifications can be corrected. FIG. 7 shows the principle of the simultaneous correction.

Figure 8:
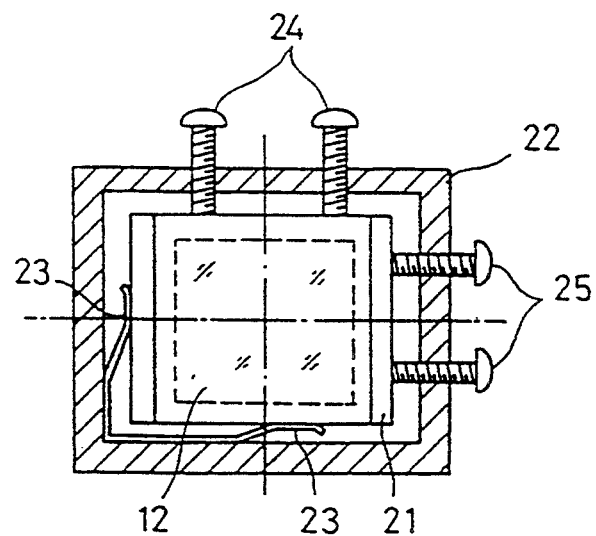
FIG. 8 is a sectional view of an adjusting mechanism which moves a condenser lens group in directions perpendicular to the optical axis.

FIG. 8 shows a parallax adjusting mechanism in which the condenser lens group 12 is decentered or offset from the optical axis, by way of example. In FIG. 8, the condenser lens group 12 is held by a rectangular lens frame 21 which is supported in a finder frame 22 to move in planes perpendicular to the optical axis. Leaf springs 23 are secured to the two adjacent sides of the finder frame 22 and are elastically depressed against the two corresponding adjacent sides of the lens frame 21. The remaining two sides of the finder frame 2w are provided with adjusting screws 24 and 25 which come into contact at the front ends thereof with the two corresponding sides of the lens frame 21. Thus, the lens frame 21, and accordingly the condenser lens group 12, can be moved in the orthogonal directions perpendicular to the optical axis by the adjustment of the adjusting screws 24 and 25.

As can be understood from the above discussion, according to the present invention, aberrations can be precisely corrected, even in a real image type of small view finder having a high variable power. Furthermore, according to the present invention, the parallax error correction upon assembly of the view finder can be easily and reliably effected.

The distance of the condenser lens group 12 from the primary image formation plane 13 preferably satisfies the following relationship, as mentioned above.

$$0.65 < s/f_{OW} < 1.2$$

wherein "s" designates the reduced distance between the image formation plane 13 and the first lens surface of the condenser lens group 12 adjacent to an object to be taken; and "$f_{OW}$" the resultant focal length of the objective lens group 11 and the condenser lens group 12. In case of the variable power objective lens group 11Z, "$f_{OW}$" designates the resultant focal length of the shortest focal length thereof and the focal length of the condenser lens group 12.

If the value of $s/f_{OW}$ is below 0.65, satisfactory parallax error correction cannot be expected, and if the value of $s/f_{OW}$ is above 1.2, the view finder becomes unacceptably large.

The following discussion will be directed to several embodiments (examples) of the present invention. In the first through eighth embodiments discussed below, the objective lens group 12 is constituted by the variable power objective lens group 11Z. In the first through fourth embodiments and the seventh and eighth embodiments, the field flattener is provided and in the fifth and sixth embodiments, the plane-parallel plate 16 is provided.

The negative lens group 11n of the variable power objective lens group 11Z is comprised of a single lens, and the positive lens group 11p is comprised of two lens groups 11$p_1$ and 11$p_2$. The condenser lens group 12 and the field flattener 17 are each comprised of a single lens. The eyepiece group 15 is comprised of two lens groups 15a and 15b. A glass cover CG is located in front of the negative lens group 11n of the objective lens group 11. Note that the glass cover CG does not constitute an optical lens system. However, the lens data below includes data of the glass cover CG.

In the 1st through 8th embodiments, the primary image formation plane 13 is substantially coincident with the surface r12 of the field flattener 17 or the plane-parallel plate 16. In the lens data below, "r" designates the radius of curvature (mm) of each lens surface, "D" the lens thickness or lens distance (mm), "n" the refractive index of the d-line of each lens, and "$\nu$" the Abbe's number of each lens, respectively.

Embodiment 1 (1st example)

Figure 9:
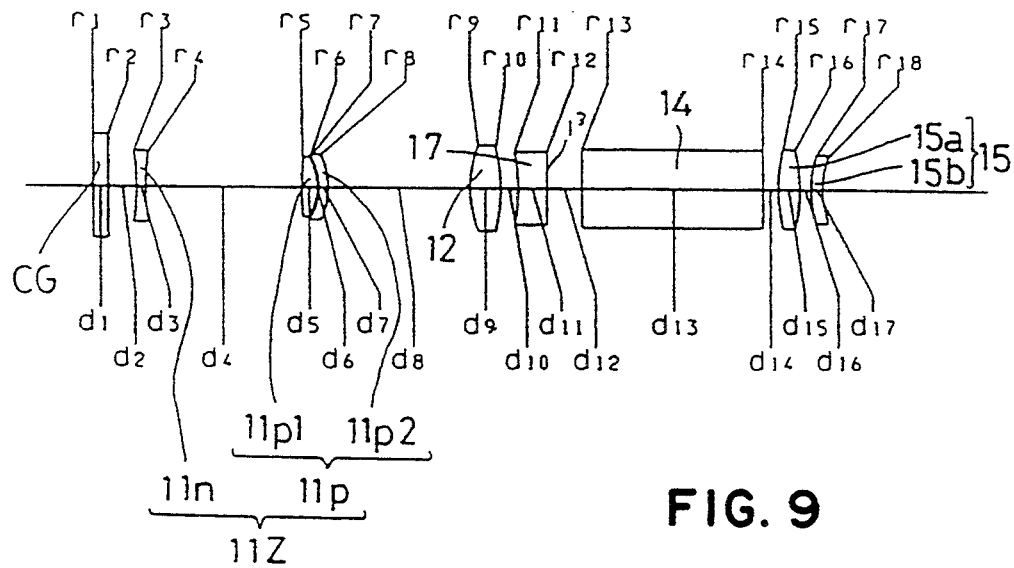
FIG. 9 is a diagram of an optical arrangement of a first embodiment of a real image type of variable power view finder at a small (smallest) magnification, according to the present invention.
Figures 10A, 10B, 10C, 10D:
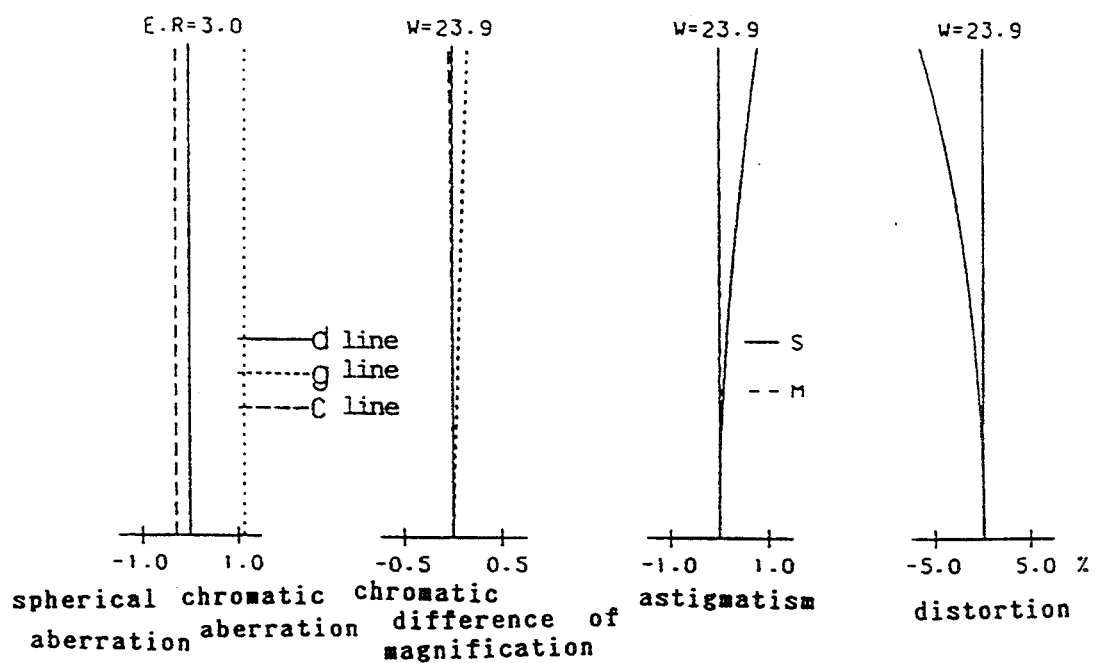
FIGS. 10A–10D show diagrams of aberrations of the view finder shown in FIG. 9.
Figure 11:
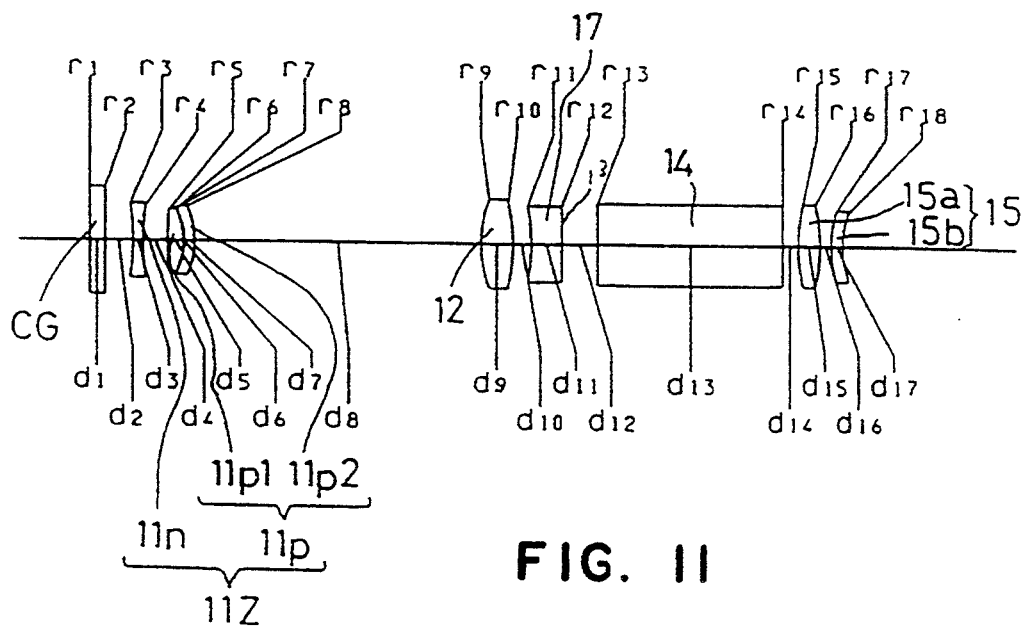
FIG. 11 is a diagram of an optical arrangement of a first embodiment of a real image type of variable power view finder at a large (largest) magnification, according to the present invention.
Figures 12A, 12B, 12C, 12D:
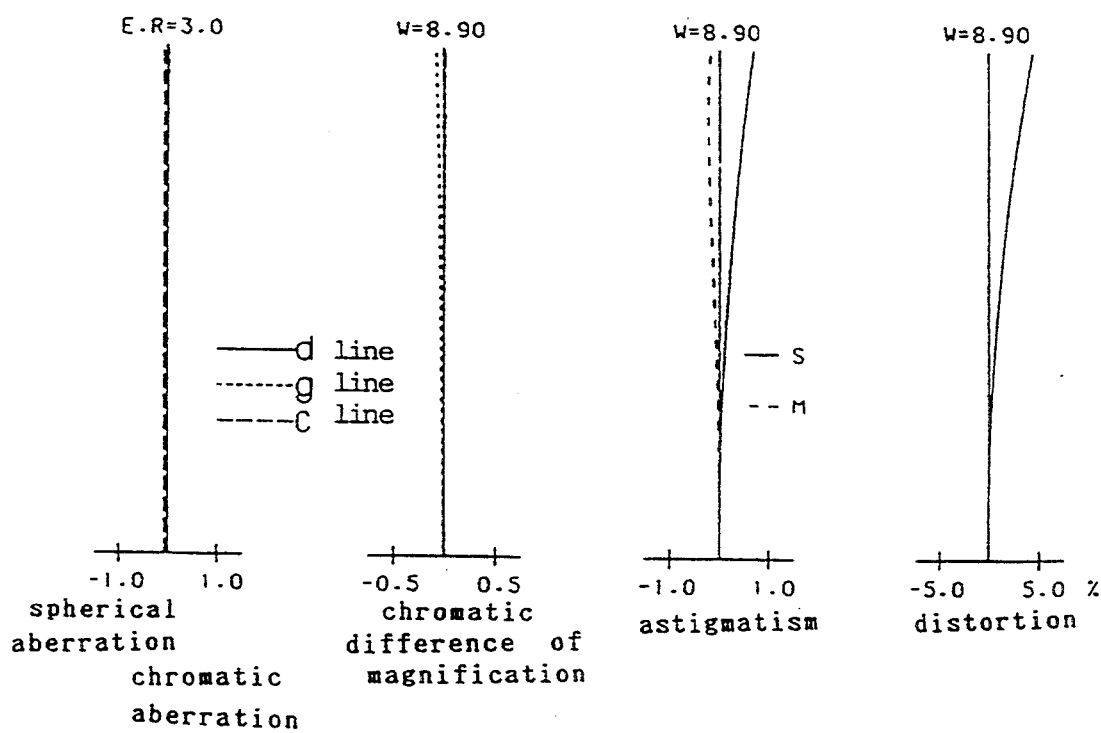
FIGS. 12A–12D show diagrams of aberrations of a view finder shown in FIG. 11.

FIGS. 9 and 11 show the optical lens arrangements at the low and high magnifications, respectively, and FIGS. 10A–10D and 12A–12D show the various aberrations thereof.

Table 1 below shows lens data of the 1st example.

TABLE 1

| No. | r | D | n | $\nu$ |
|---|---|---|---|---|
| 1 | ∞ | 1.80 | 1.49176 | 57.4 |
| 2 | ∞ | 3.43 (WIDE) ~3.28 (TELE) | — | |
| 3* | −24.757 | 1.10 | 1.58547 | 29.9 |
| 4 | 29.125 | 18.99 (WIDE) ~2.82 (TELE) | — | |
| 5* | 27.932 | 1.85 | 1.491756 | 57.4 |
| 6 | −7.678 | 0.18 | — | |
| 7 | −6.879 | 1.17 | 1.58547 | 29.9 |
| 8* | −9.237 | 16.95 (WIDE) ~33.27 (TELE) | — | |
| 9 | 13.230 | 3.70 | 1.49176 | 57.4 |
| 10* | −16.760 | 2.11 | — | |
| 11 | −20.401 | 3.50 | 1.58547 | 29.9 |
| 12 | ∞ | 4.27 | — | |
| 13 | ∞ | 21.80 | 1.49176 | 57.4 |
| 14 | ∞ | 1.90 | — | |
| 15* | 18.212 | 2.60 | 1.49176 | 57.4 |
| 16 | −20.102 | 1.40 | — | |
| 17 | 12.271 | 1.40 | 1.49176 | 57.4 |
| 18 | 10.436 | — | — | |

Note "*" represents the aspheric surface.

Aspheric Lens Data

No. 3: $A4 = 0.45026 \times 10^{-4}$, $A6 = 0.97864 \times 10^{-7}$, $A8 = -0.33999 \times 10^{-7}$ No. 5: $A4 = -0.36260 \times 10^{-3}$, $A6 = -0.15505 \times 10^{-5}$, $A8 = -0.58550 \times 10^{-6}$ No. 8: $A4 = -0.17650 \times 10^{-3}$, $A6 = -0.24177 \times 10^{-5}$, $A8 = -0.28898 \times 10^{-6}$ No. 10: $A4 = 0.27158 \times 10^{-3}$, $A6 = -0.18552 \times 10^{-5}$ No. 15: $A4 = -0.82254 \times 10^{-4}$, $A6 = 0.18545 \times 10^{-6}$ Note that the aspheric surface is defined by the following formula;

$$x = cy^2 / \{1 + [1 - (1+K)c^2 y^2]^{\frac{1}{2}}\} + A4y^4 + A6y^6 + A8y^8$$

Embodiment 2 (2nd example)

Figure 13:
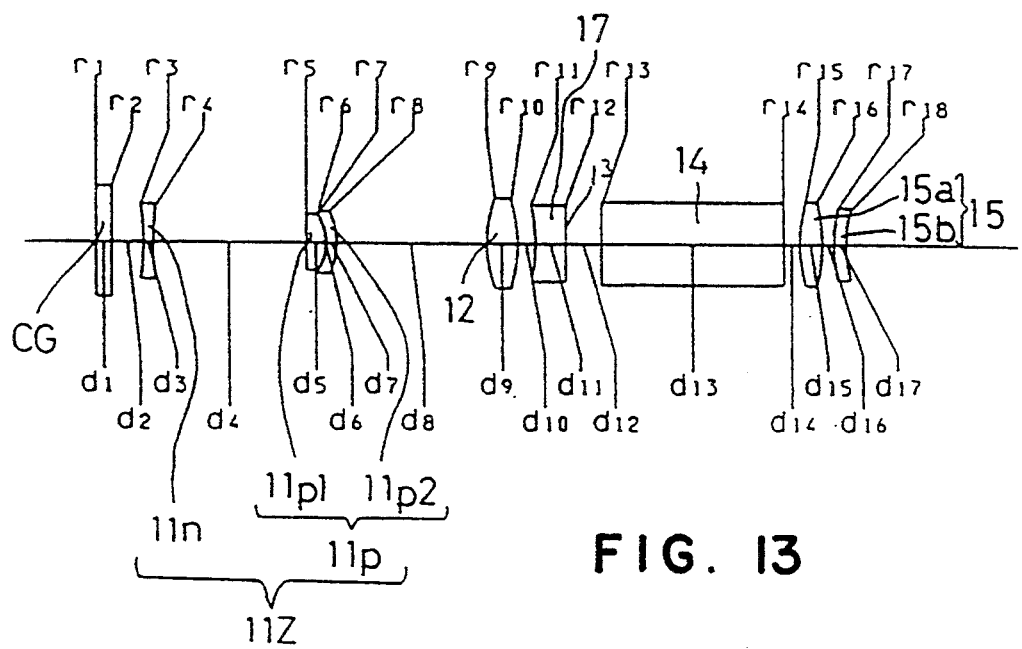
FIG. 13 is a diagram of an optical arrangement of a second embodiment of a real image type of variable power view finder at a small magnification, according to the present invention.
Figures 14A, 14B, 14C, 14D:
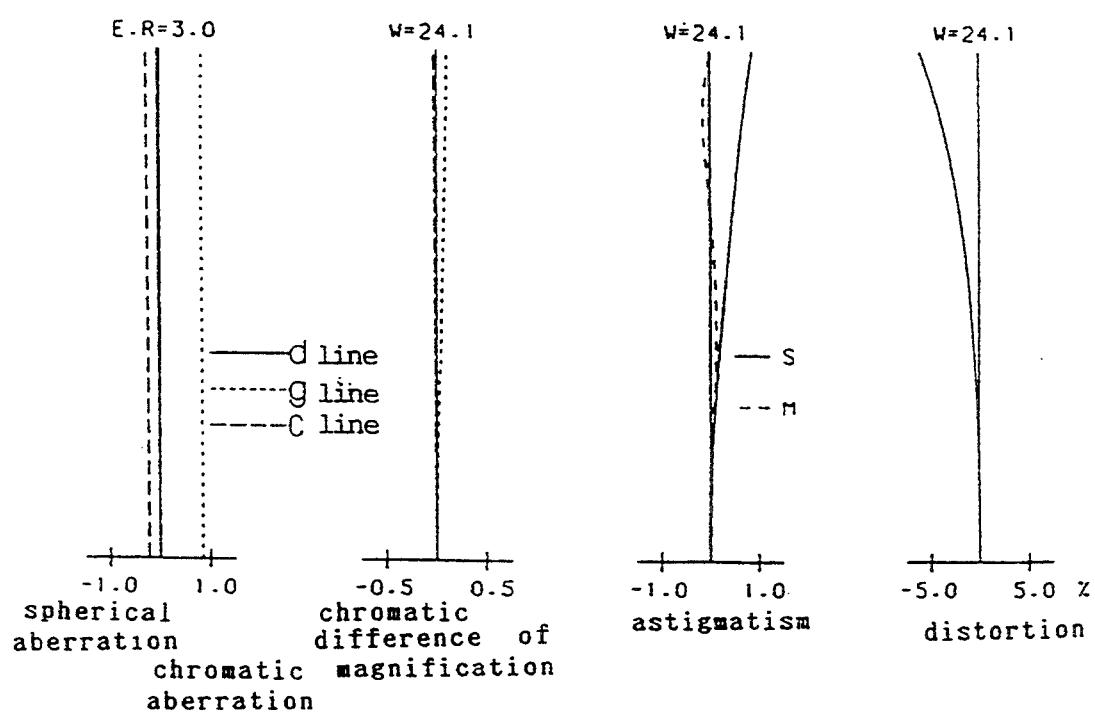
FIGS. 14A–14D show diagrams of aberrations of the view finder shown in FIG. 13.
Figure 15:
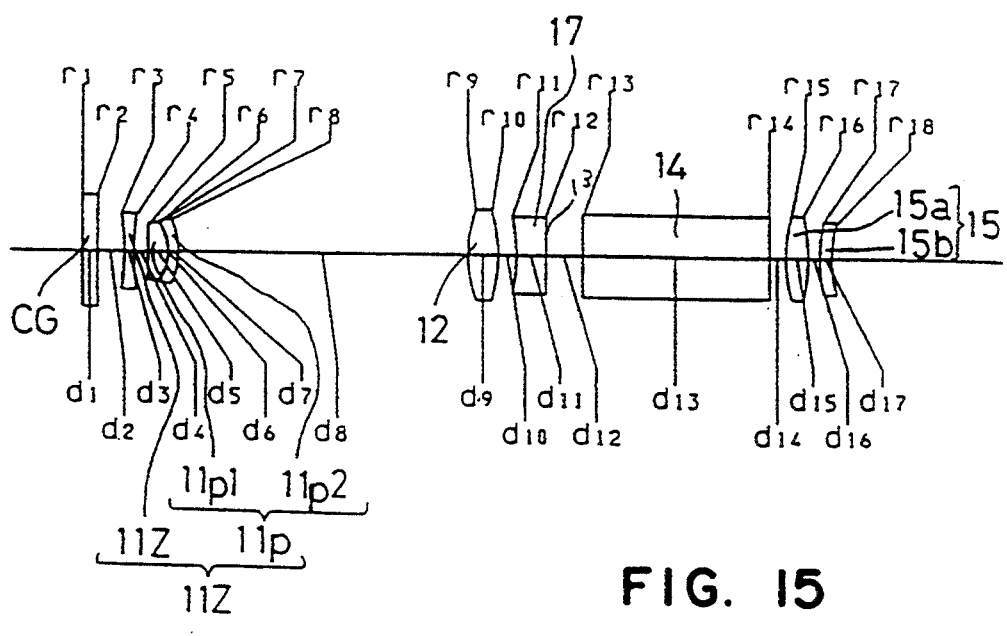
FIG. 15 is a diagram of an optical arrangement of a second embodiment of a real image type of variable power view finder at a large magnification, according to the present invention.
Figures 16A, 16B, 16C, 16D:
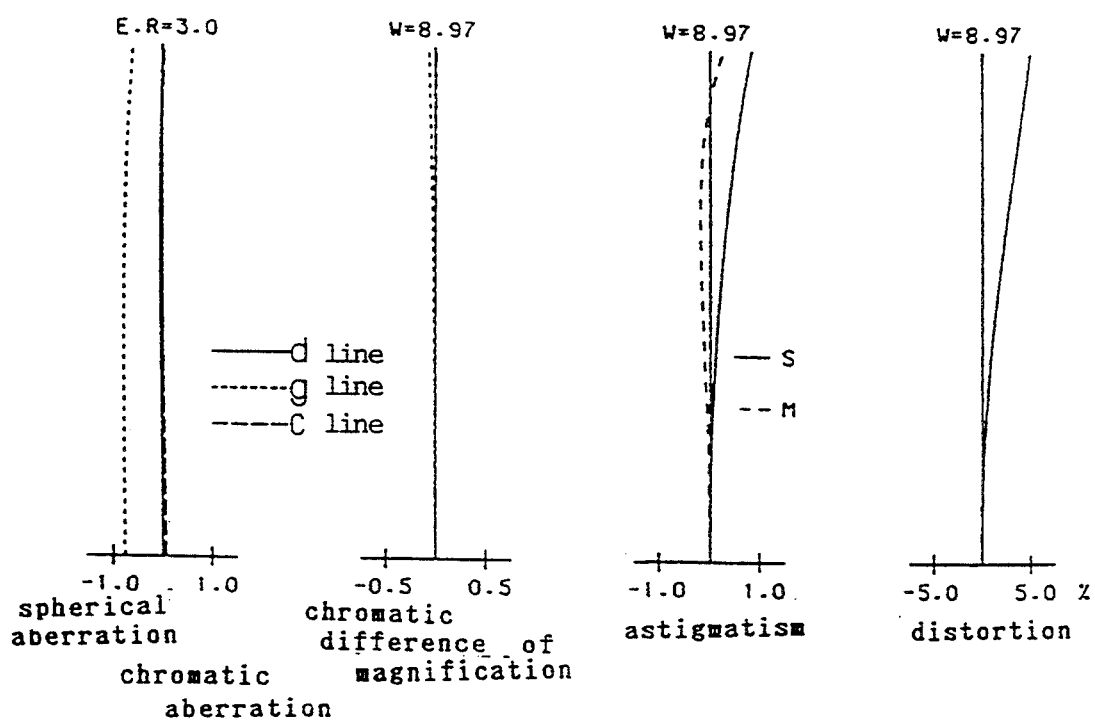
FIGS. 16A–16D show diagrams of aberrations of the view finder shown in FIG. 15.

FIGS. 13 and 15 show the optical lens arrangements at the low and high magnifications, respectively, and FIGS. 14A–14D and 16A–16D show the various aberrations thereof.

Table 2 below shows lens data of the 2nd example.

TABLE 2

| No. | r | D | n | $\nu$ |
|---|---|---|---|---|
| 1 | ∞ | 1.80 | 1.49176 | 57.4 |
| 2 | ∞ | 3.66 (WIDE) ~3.20 (TELE) | — | |
| 3* | −25.427 | 1.10 | 1.58547 | 29.9 |
| 4 | 29.914 | 17.74 (WIDE) ~1.69 (TELE) | — | |
| 5* | 70.883 | 2.27 | 1.49176 | 57.4 |
| 6 | −5.491 | 0.10 | — | |
| 7 | −5.458 | 1.17 | 1.58547 | 29.9 |
| 8* | −8.405 | 17.41 (WIDE) ~33.92 (TELE) | — | |
| 9 | 13.869 | 3.70 | 1.49176 | 57.4 |
| 10* | −13.469 | 2.11 | — | |
| 11 | −19.572 | 3.50 | 1.58547 | 29.9 |
| 12 | ∞ | 4.27 | — | |
| 13 | ∞ | 21.80 | 1.49176 | 57.4 |
| 14 | ∞ | 1.90 | — | |
| 15* | 15.508 | 2.60 | 1.49176 | 57.4 |
| 16 | −20.348 | 1.40 | — | |
| 17 | 19.620 | 1.40 | 1.49176 | 57.4 |
| 18 | 13.864 | — | — | |

Note "*" represents the aspheric surface.

Aspheric Lens Data

No. 3: $A4 = 0.93564 \times 10^{-4}$, $A6 = -0.45410 \times 10^{-5}$, $A8 = 0.92846 \times 10^{-7}$ No. 5: $A4 = -0.85516 \times 10^{-3}$, $A6 = 0.32528 \times 10^{-5}$, $A8 = -0.16852 \times 10^{-5}$ No. 8: $A4 = -0.34470 \times 10^{-3}$, $A6 = -0.32151 \times 10^{-5}$, $A8 = -0.50079 \times 10^{-6}$ No. 10: $A4 = 0.41378 \times 10^{-3}$, $A6 = -0.41601 \times 10^{-5}$ No. 15: $A4 = -0.10011 \times 10^{-3}$, $A6 = -0.68680 \times 10^{-7}$ Embodiment 3 (3rd example)

Figure 17:
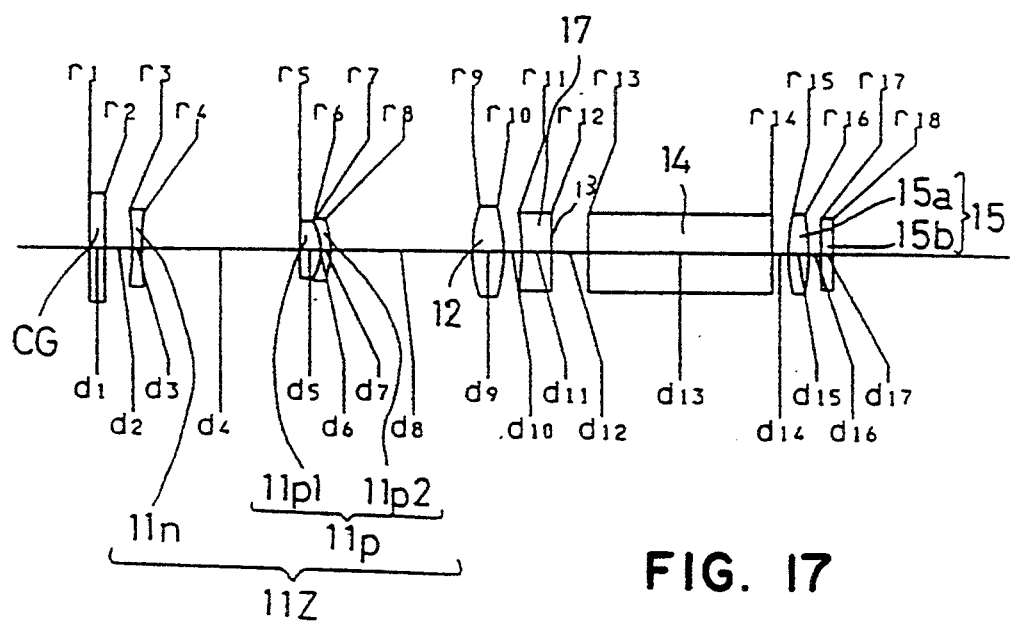
FIG. 17 is a diagram of an optical arrangement of a third embodiment of a real image type of variable power view finder at a small magnification, according to the present invention.
Figures 18A, 18B, 18C, 18D:
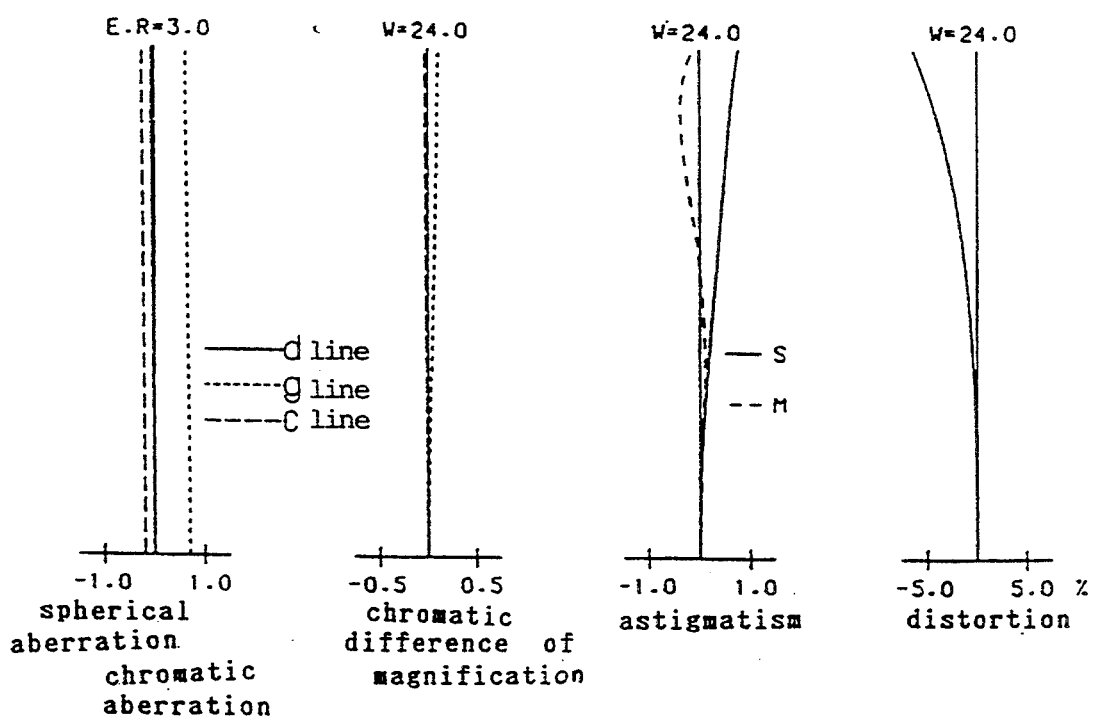
FIGS. 18A–18D show diagrams of aberrations of the view finder shown in FIG. 17.
Figure 19:
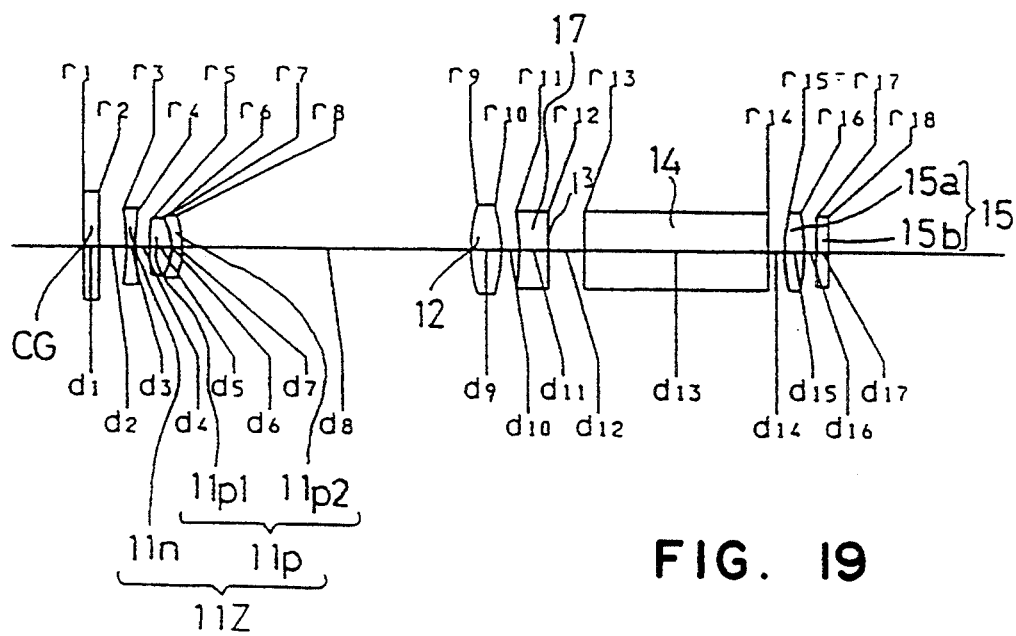
FIG. 19 is a diagram of an optical arrangement of a third embodiment of a real image type of variable power view finder at a large magnification, according to the present invention.
Figures 20A, 20B, 20C, 20D:
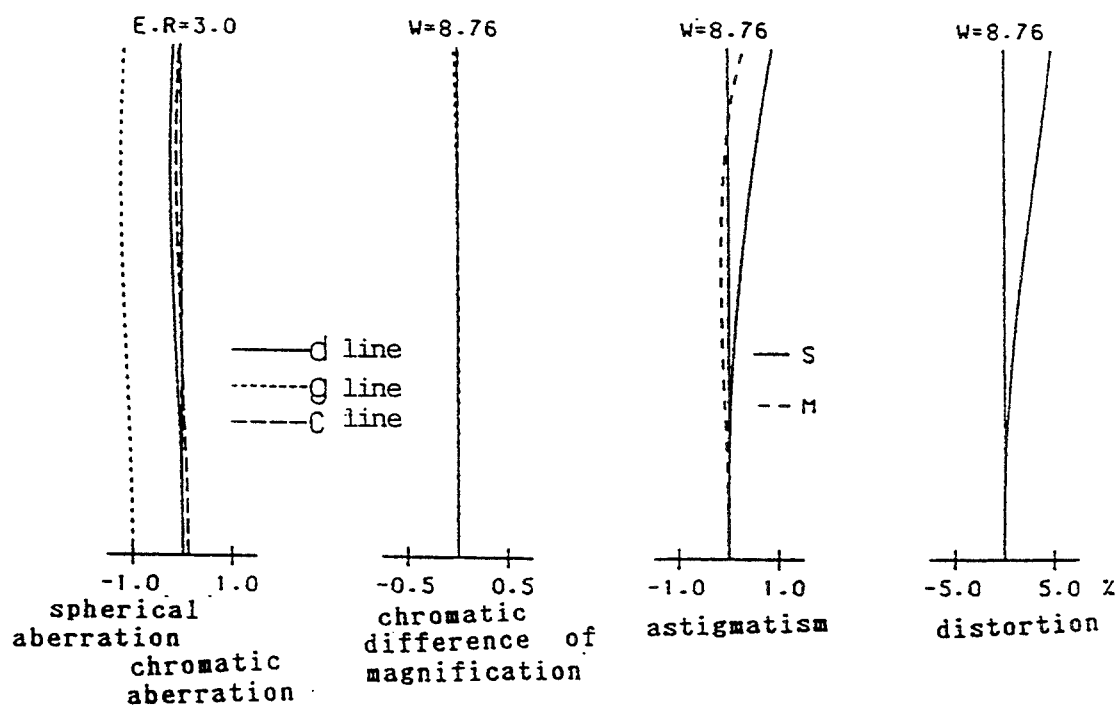
FIGS. 20A–20D show diagrams of aberrations of the view finder shown in FIG. 19.

FIGS. 17 and 19 show the optical lens arrangements at the low and high magnifications, respectively, and FIGS. 18A–18D and 20A–20D show the various aberrations thereof.

Table 3 below shows lens data of the 3rd example.

TABLE 3

| No. | r | D | n | v |
|---|---|---|---|---|
| 1 | ∞ | 1.80 | 1.49176 | 57.4 |
| 2 | ∞ | 3.20 (WIDE) ~3.20 (TELE) | — | |
| 3* | −25.910 | 1.10 | 1.58547 | 29.9 |
| 4 | 30.482 | 18.41 (WIDE) ~1.70 (TELE) | — | |
| 5* | 28.722 | 2.51 | 1.49176 | 57.4 |
| 6 | −5.929 | 0.10 | — | |
| 7 | −5.876 | 1.17 | 1.58547 | 29.9 |
| 8* | −9.866 | 16.95 (WIDE) ~33.67 (TELE) | — | |
| 9 | 15.813 | 3.70 | 1.49176 | 57.4 |
| 10* | −12.984 | 2.11 | — | |
| 11 | −26.934 | 3.50 | 1.58547 | 29.9 |
| 12 | ∞ | 4.27 | — | |
| 13 | ∞ | 21.26 | 1.49176 | 57.4 |
| 14 | ∞ | 1.90 | — | |
| 15* | 18.726 | 2.30 | 1.49176 | 57.4 |
| 16 | −23.299 | 1.40 | — | |
| 17 | ∞ | 1.40 | 1.49176 | 57.4 |
| 18 | ∞ | — | — | |

Note "*" represents the aspheric surface.

Aspheric Lens Data

No. 3: $A4=0.10634\times 10^{-3}$, $A6=-0.67246\times 10^{-5}$, $A8=0.16203\times 10^{-6}$ No. 5: $A4=-0.56091\times 10^{-3}$, $A6=0.11528\times 10^{-4}$, $A8=-0.95301\times 10^{-6}$ No. 8: $A4=-0.18788\times 10^{-3}$, $A6=-0.50068\times 10^{-5}$, No. 10: $A4=0.44639\times 10^{-3}$, $A6=-0.41478\times 10^{-5}$, No. 15: $A4=-0.61554\times 10^{-4}$, $A6=-0.89530\times 10^{-7}$ Embodiment 4 (4th example)

Figure 21:
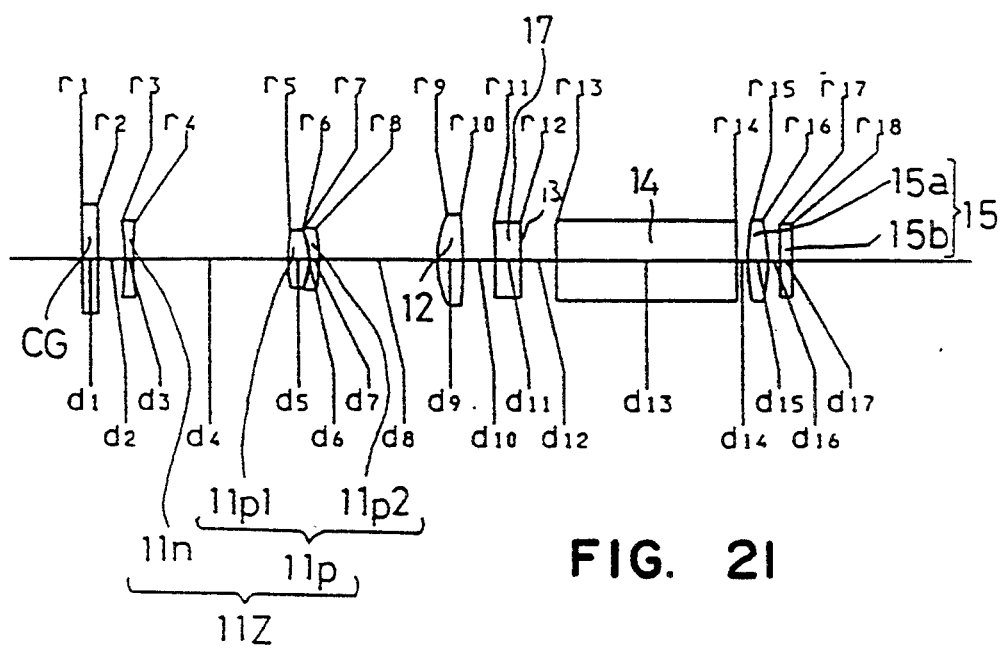
FIG. 21 is a diagram of an optical arrangement of a fourth embodiment of a real image type of variable power view finder at a small magnification, according to the present invention.
Figures 22A, 22B, 22C, 22D:
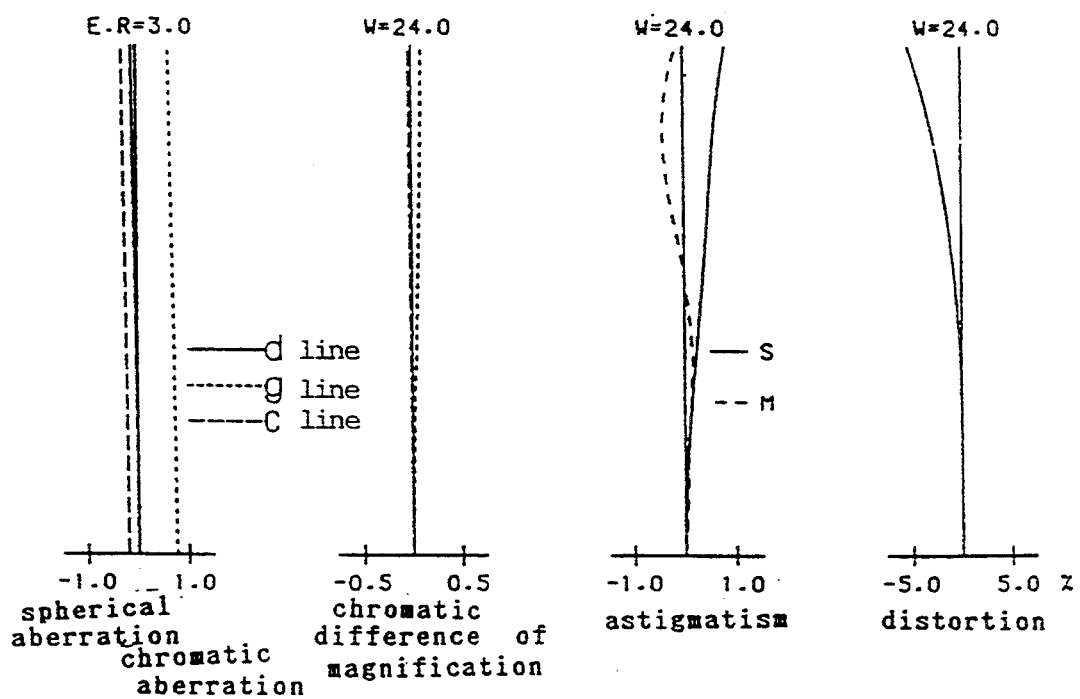
FIGS. 22A–22D show diagrams of aberrations of the view finder shown in FIG. 21.
Figure 23:
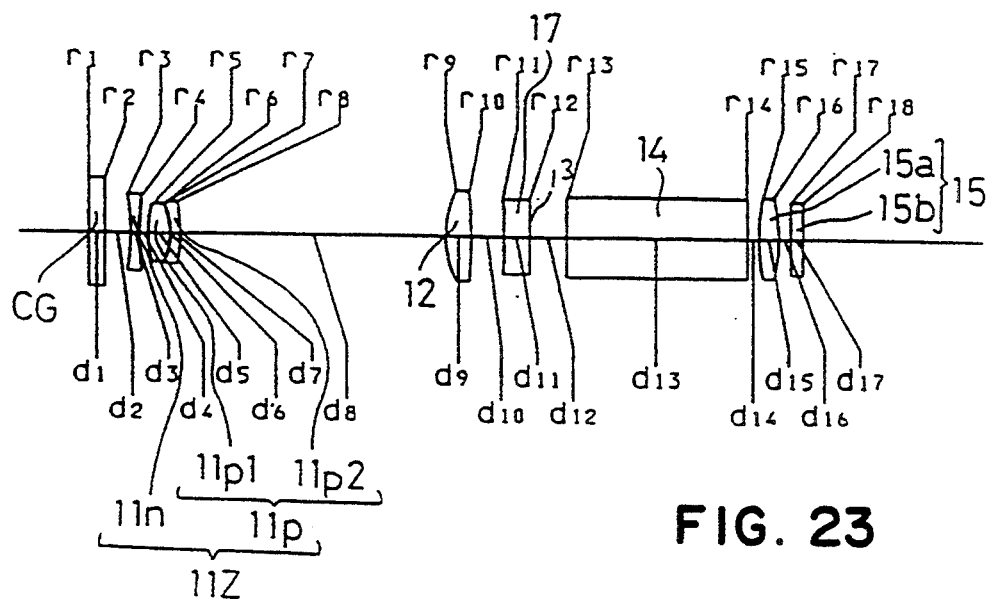
FIG. 23 is a diagram of an optical arrangement of a fourth embodiment of a real image type of variable power view finder at a large magnification, according to the present invention.
Figures 24A, 24B, 24C, 24D:
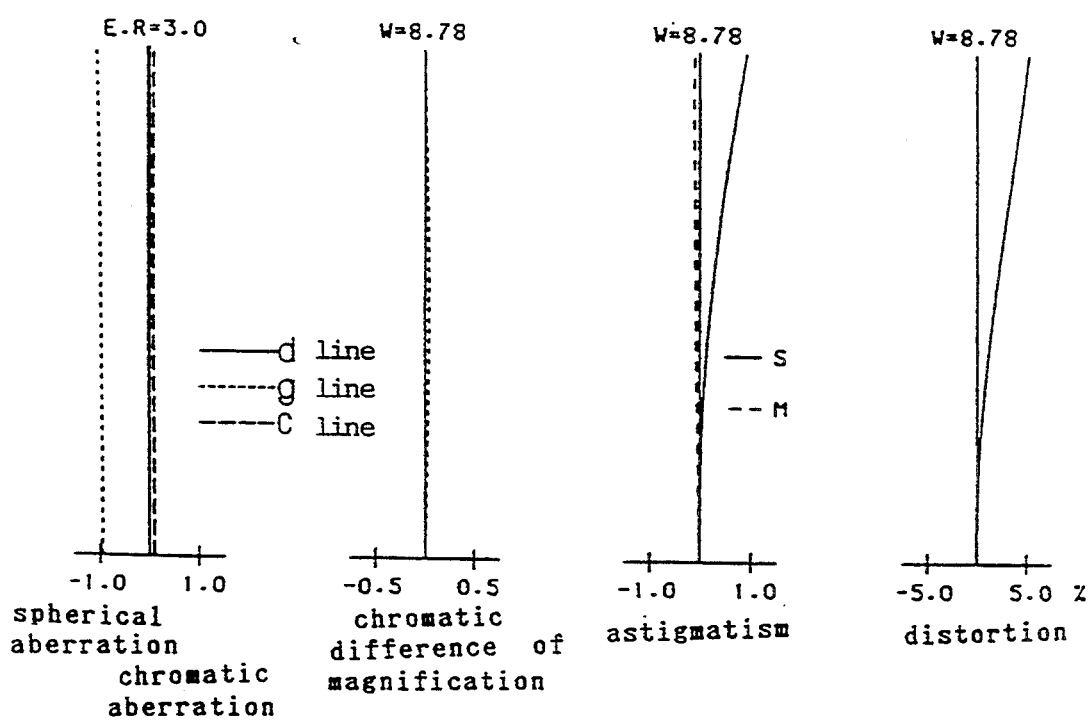
FIGS. 24A–24D show diagrams of aberrations of the view finder shown in FIG. 23.

FIGS. 21 and 23 show the optical lens arrangements at the low and high magnifications, respectively, and FIGS. 22A-22D and 24A-24D show the various aberrations thereof.

Table 4 below shows lens data of the 4th example.

TABLE 4

| No. | r | D | n | v |
|---|---|---|---|---|
| 1 | ∞ | 1.83 | 1.49176 | 57.4 |
| 2 | ∞ | 3.20 (WIDE) ~2.96 (TELE) | — | |
| 3* | −22.140 | 1.00 | 1.58547 | 29.9 |
| 4* | 45.798 | 17.86 (WIDE) ~1.05 (TELE) | — | |
| 5* | 14.083 | 2.53 | 1.49176 | 57.4 |
| 6 | −7.406 | 0.10 | — | |
| 7 | −7.343 | 1.14 | 1.58547 | 29.9 |
| 8* | −15.248 | 13.99 (WIDE) ~31.04 (TELE) | — | |
| 9 | 11.562 | 3.00 | 1.49176 | 57.4 |
| 10 | −52.376 | 3.73 | — | |
| 11* | 59.216 | 3.03 | 1.49176 | 57.4 |
| 12 | ∞ | 4.27 | — | |
| 13 | ∞ | 20.76 | 1.49176 | 57.4 |
| 14 | ∞ | 1.40 | — | |
| 15 | 22.192 | 2.28 | 1.49176 | 57.4 |
| 16 | −18.452 | 1.40 | — | |
| 17 | ∞ | 1.40 | 1.49176 | 57.4 |
| 18 | ∞ | — | — | |

Note "*" represents the aspheric surface.

Aspheric Lens Data

No. 3: $A4=0.47832\times 10^{-4}$, $A6=0.15486\times 10^{-4}$, $A8=0.55221\times 10^{-6}$ No. 4: $A4=-0.11519\times 10^{-3}$, $A6=0.33296\times 10^{-4}$, $A8=-0.12681\times 10^{-5}$ No. 5: $A4=-0.17325\times 10^{-3}$, $A6=0.26977\times 10^{-4}$, $A8=-0.99998\times 10^{-6}$ No. 8: $A4=0.85086\times 10^{-4}$, $A6=0.38492\times 10^{-5}$ No. 11: $A4=-0.11121\times 10^{-2}$, $A6=0.16258\times 10^{-4}$ Embodiment 5 (5th example)

Figure 25:
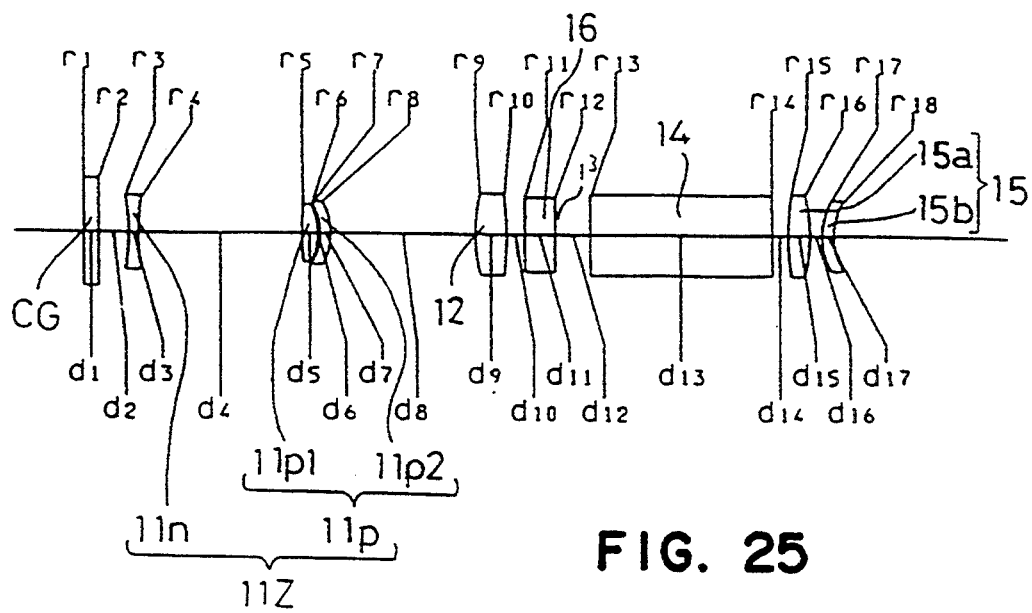
FIG. 25 is a diagram of an optical arrangement of a fifth embodiment of a real image type of variable power view finder at a small magnification, according to the present invention.
Figures 26A, 26B, 26C, 26D:
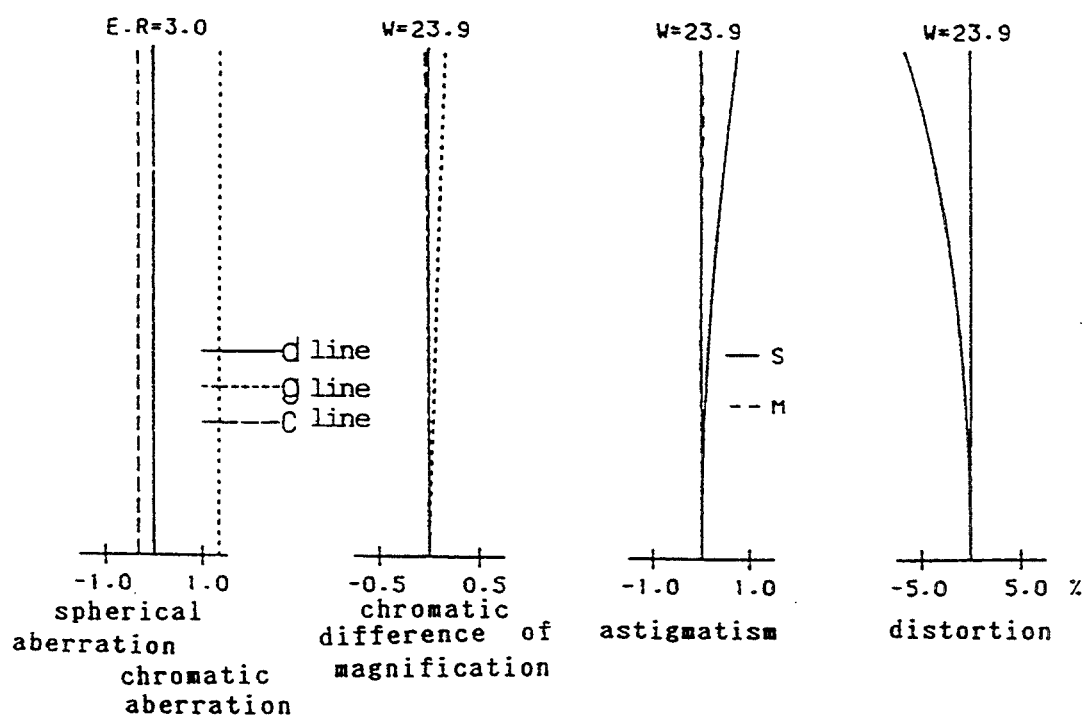
FIGS. 26A–26D show diagrams of aberrations of the view finder shown in FIG. 25.
Figure 27:
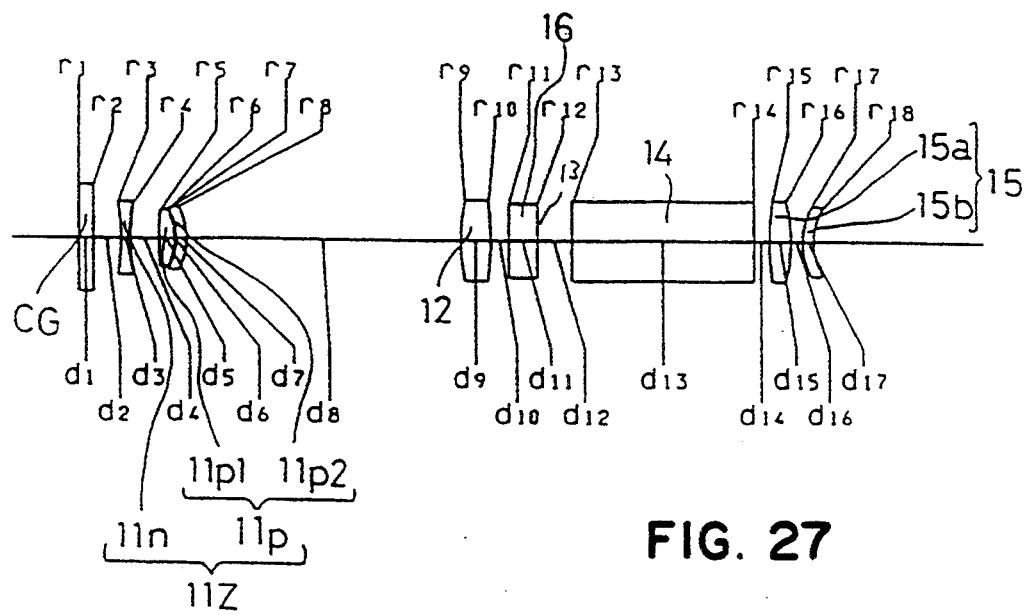
FIG. 27 is a diagram of an optical arrangement of a fifth embodiment of a real image type of variable power view finder at a large magnification, according to the present invention.
Figures 28A, 28B, 28C, 28D:
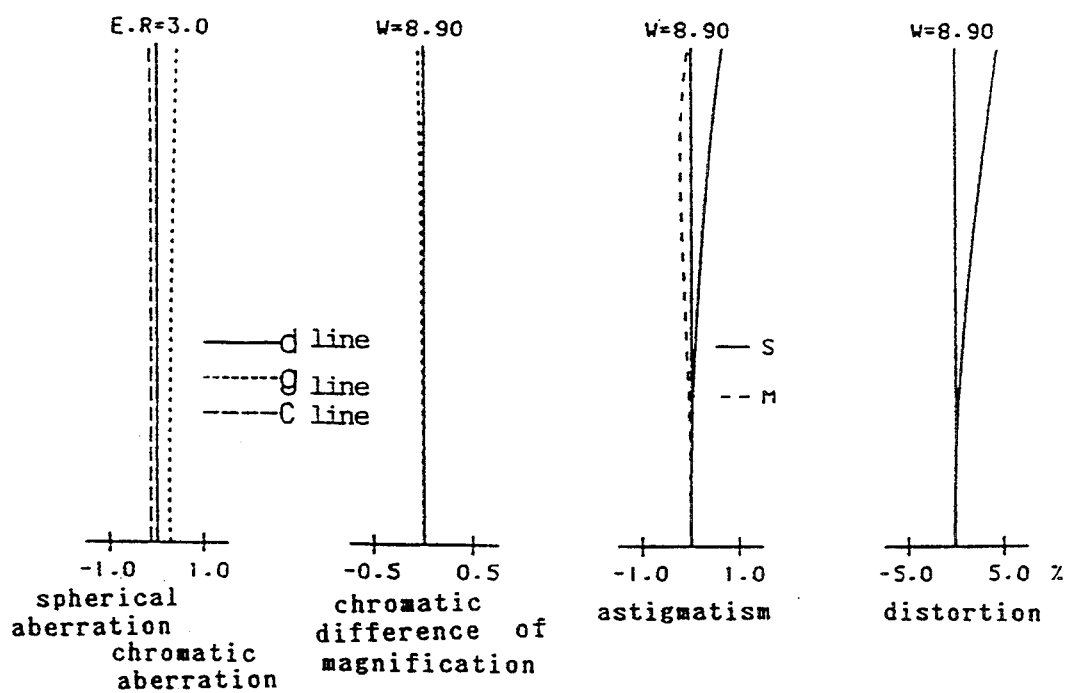
FIGS. 28A–28D show diagrams of aberrations of the view finder shown in FIG. 27.

FIGS. 25 and 27 show the optical lens arrangements at the low and high magnifications, respectively, and FIGS. 26A-D and 28A-28D show the various aberrations thereof.

Table 5 below shows lens data of the 5th example.

TABLE 5

| No. | r | D | n | v |
|---|---|---|---|---|
| 1 | ∞ | 1.80 | 1.49176 | 57.4 |
| 2 | ∞ | 3.55 (WIDE) ~3.38 (TELE) | — | |
| 3* | −22.621 | 1.10 | 1.58547 | 29.9 |
| 4 | 26.612 | 18.89 (WIDE) ~3.42 (TELE) | — | |
| 5* | 30.552 | 1.85 | 1.49176 | 57.4 |
| 6 | −7.647 | 0.29 | — | |
| 7 | −6.077 | 1.17 | 1.58547 | 29.9 |
| 8* | −7.534 | 16.95 (WIDE) ~32.59 (TELE) | — | |
| 9 | 19.176 | 3.70 | 1.49176 | 57.4 |
| 10* | −24.593 | 2.11 | — | |
| 11 | ∞ | 3.50 | 1.58547 | 29.9 |
| 12 | ∞ | 4.27 | — | |
| 13 | ∞ | 21.80 | 1.49176 | 57.4 |
| 14 | ∞ | 1.90 | — | |
| 15* | 24.735 | 2.60 | 1.49176 | 57.4 |
| 16 | −18.565 | 1.40 | — | |
| 17 | 7.766 | 1.40 | 1.49176 | 57.4 |
| 18 | 7.245 | — | — | |

Note "*" represents the aspheric surface.

Aspheric Lens Data

No. 3: $A4=0.38503\times 10^{-4}$, $A6=0.12817\times 10^{-5}$, $A8=-0.79083\times 10^{-7}$ No. 5: $A4=-0.34063\times 10^{-3}$, $A6=-0.46670\times 10^{-5}$, $A8=-0.36690\times 10^{-6}$ No. 8: $A4=-0.17297\times 10^{-3}$, $A6=-0.33090\times 10^{-5}$, $A8=-0.24550\times 10^{-6}$ No. 10: $A4=0.32773\times 10^{-3}$, $A6=-0.29546\times 10^{-5}$ No. 15: $A4=-0.80176\times 10^{-4}$, $A6=0.34344\times 10^{-6}$ Embodiment 6 (6th example)

Figure 29:
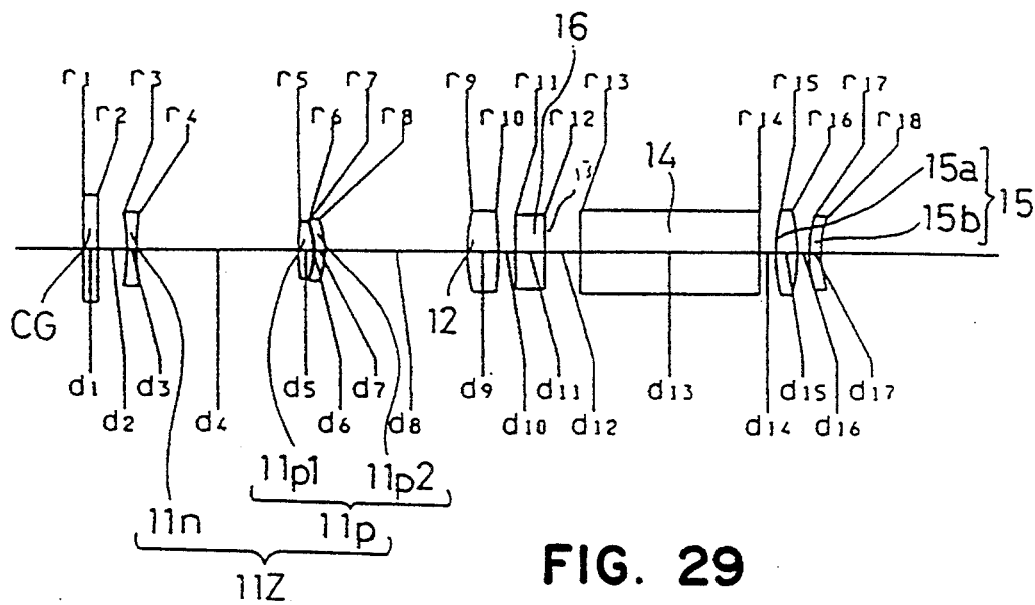
FIG. 29 is a diagram of an optical arrangement of a sixth embodiment of a real image type of variable power view finder at a small magnification, according to the present invention.
Figures 30A, 30B, 30C, 30D:
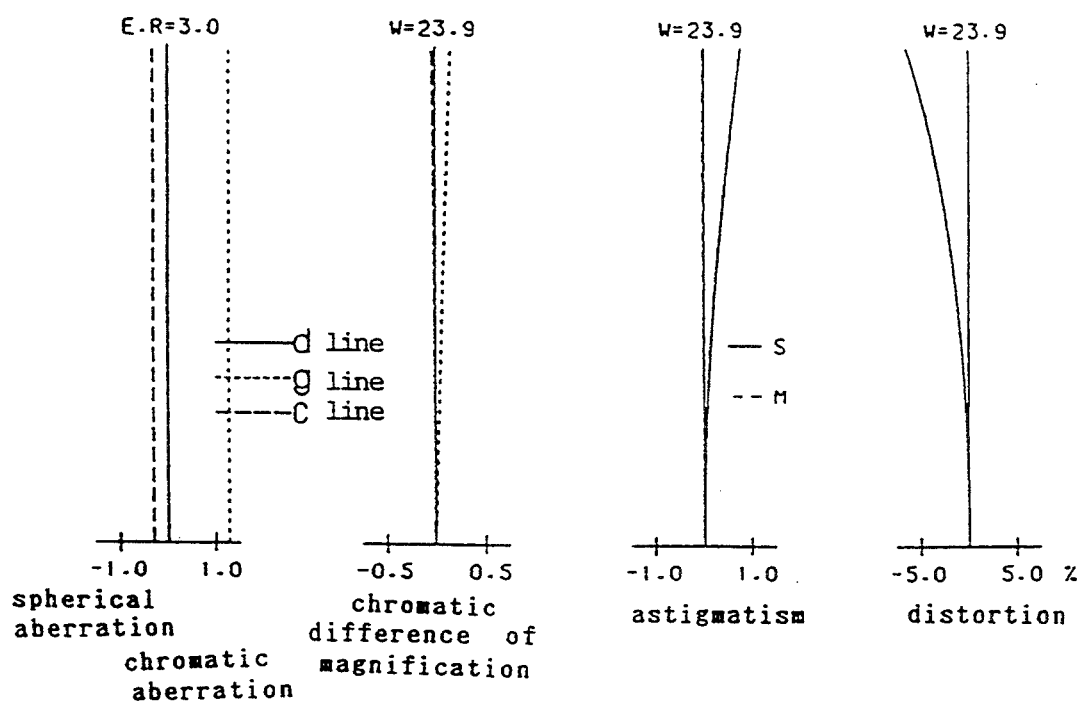
FIGS. 30A–30D show diagrams of aberrations of the view finder shown in FIG. 29.
Figure 31:
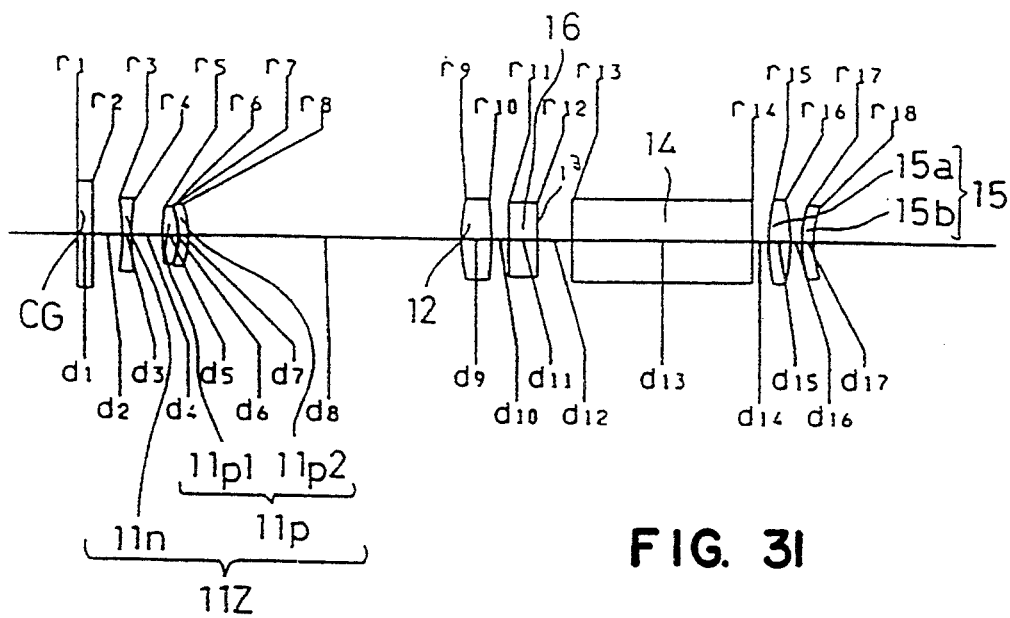
FIG. 31 is a diagram of an optical arrangement of a sixth embodiment of a real image type of variable power view finder at a large magnification, according to the present invention.
Figures 32A, 32B, 32C, 32D:
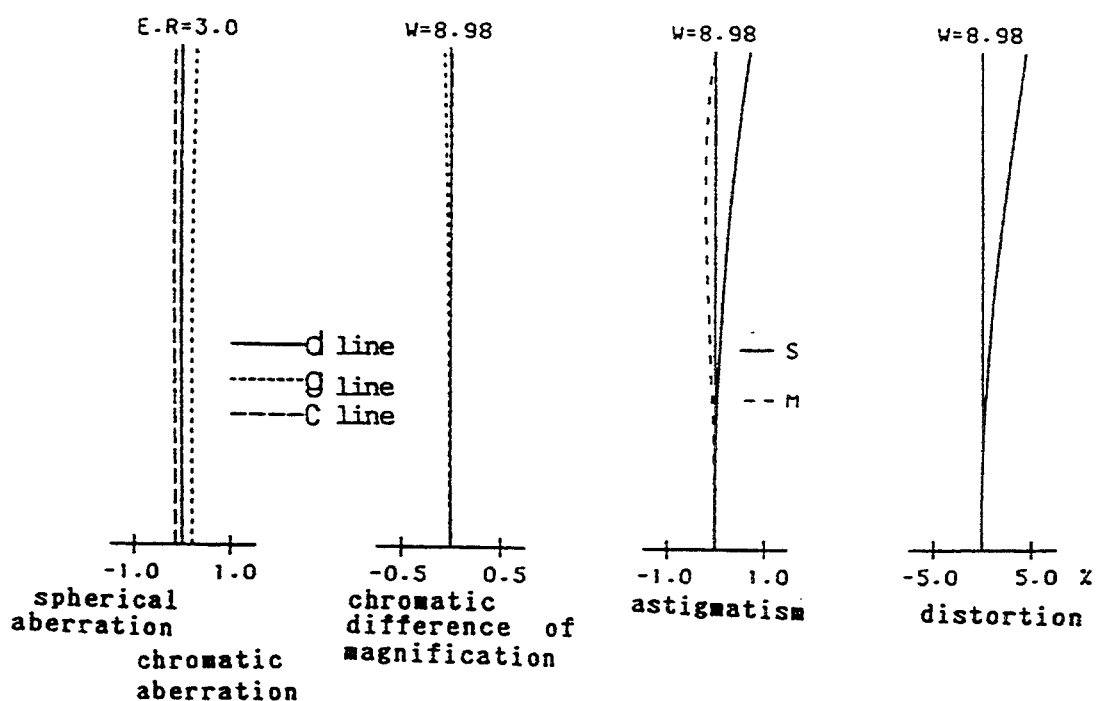
FIGS. 32A–32D show diagrams of aberrations of the view finder shown in FIG. 31.

FIGS. 29 and 31 show the optical lens arrangements at the low and high magnifications, respectively, and FIGS. 30A-30D and 32A-32D show the various aberrations thereof.

Table 6 below shows lens data of the 6th example.

TABLE 6

| No. | r | D | n | v |
|---|---|---|---|---|
| 1 | ∞ | 1.80 | 1.49176 | 57.4 |
| 2 | ∞ | 3.54 (WIDE) ~3.50 (TELE) | — | |
| 3* | −22.853 | 1.10 | 1.58547 | 29.9 |
| 4 | 26.886 | 19.19 (WIDE) ~3.75 (TELE) | — | |
| 5* | 20.915 | 1.84 | 1.49176 | 57.4 |
| 6 | −9.019 | 0.20 | — | |
| 7 | −7.783 | 1.17 | 1.58547 | 29.9 |
| 8* | −9.749 | 16.95 (WIDE) ~32.42 (TELE) | — | |
| 9 | 18.411 | 3.70 | 1.49176 | 57.4 |
| 10* | −28.019 | 2.11 | — | |
| 11 | ∞ | 3.50 | 1.58547 | 29.9 |
| 12 | ∞ | 4.27 | — | |
| 13 | ∞ | 21.80 | 1.49176 | 57.4 |
| 14 | ∞ | 1.90 | — | |
| 15* | 17.911 | 2.60 | 1.49176 | 57.4 |
| 16 | −20.264 | 1.40 | — | |
| 17 | 14.452 | 1.40 | 1.49176 | 57.4 |
| 18 | 12.000 | — | — | |

Note "*" represents the aspheric surface.

Aspheric Lens Data

No. 3: $A4=0.52476\times 10^{-4}$, $A6=-0.31175\times 10^{-6}$, $A8=-0.25405\times 10^{-7}$
No. 5: $A4=-0.28806\times 10^{-3}$, $A6=0.23640\times 10^{-5}$, $A8=-0.53133\times 10^{-6}$
No. 8: $A4=-0.11079\times 10^{-3}$, $A6=-0.76725\times 10^{-6}$, $A8=-0.21829\times 10^{-6}$
No. 10: $A4=0.31316\times 10^{-3}$, $A6=-0.25771\times 10^{-5}$
No. 15: $A4=-0.86864\times 10^{-4}$, $A6=0.17148\times 10^{-6}$

Embodiment 7 (7th example)

Figure 33:
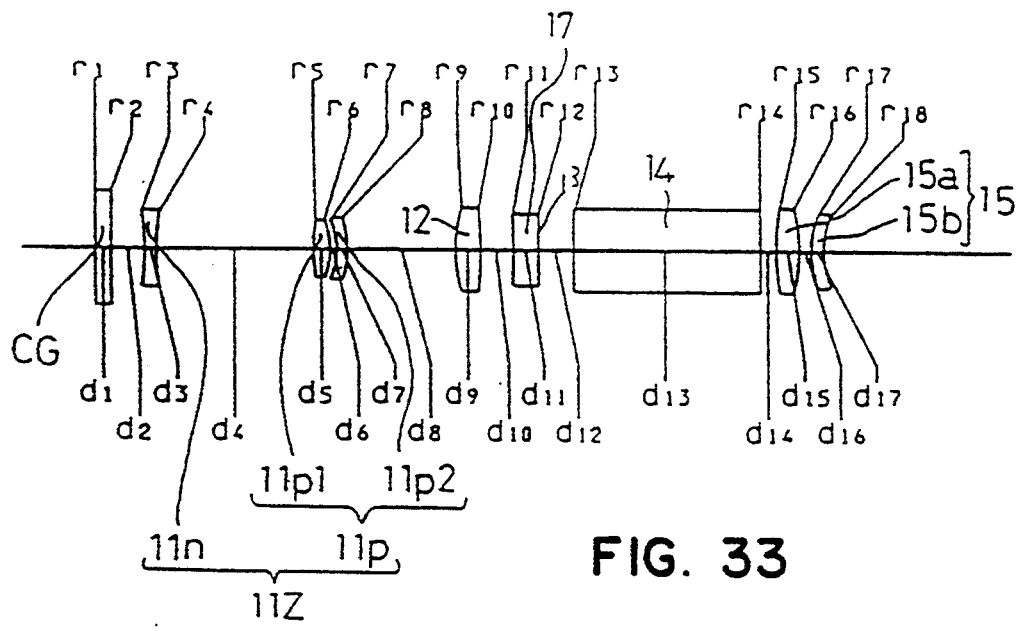
FIG. 33 is a diagram of an optical arrangement of a seventh embodiment of a real image type of variable power view finder at a small magnification, according to the present invention.
Figures 34A, 34B, 34C, 34D:
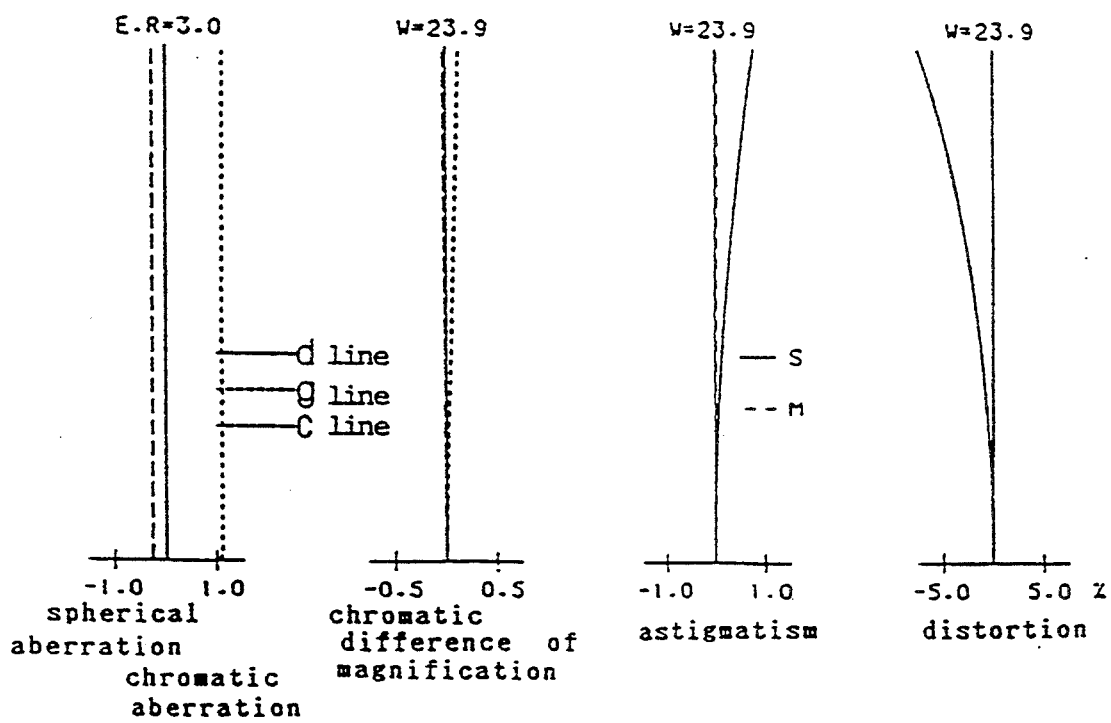
FIGS. 34A–34D show diagrams of aberrations of the view finder shown in FIG. 33.
Figure 35:
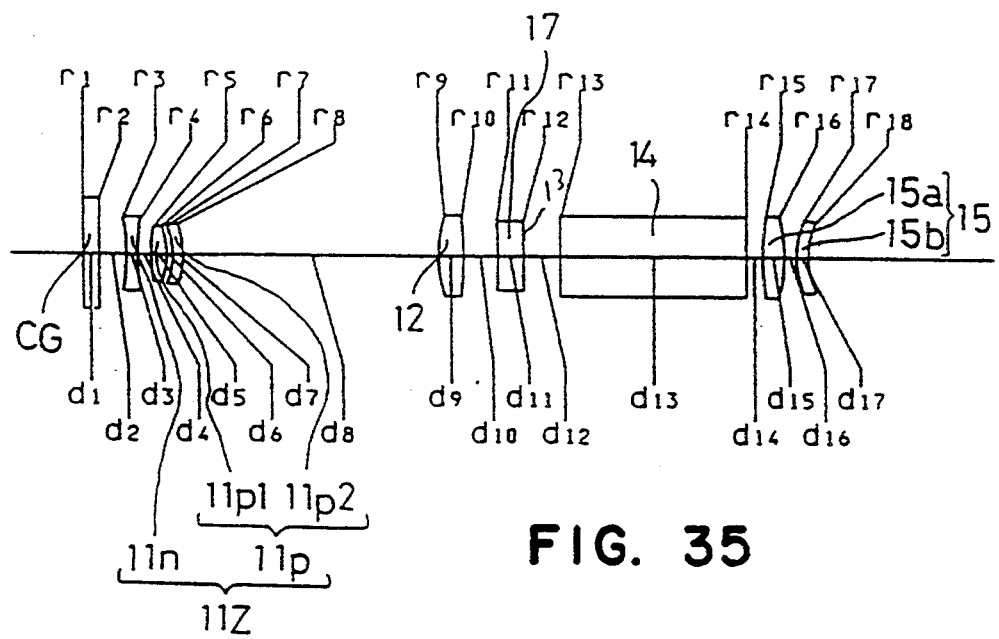
FIG. 35 is a diagram of an optical arrangement of a seventh embodiment of a real image type of variable power view finder at a large magnification, according to the present invention.
Figures 36A, 36B, 36C, 36D:
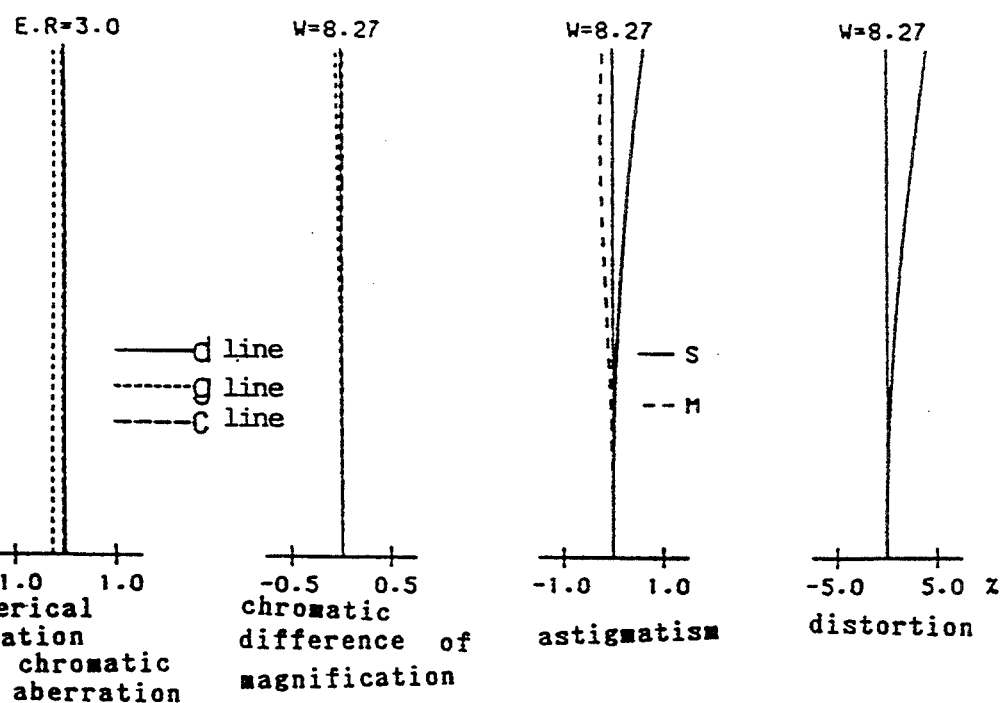
FIGS. 36A–36D show diagrams of aberrations of the view finder shown in FIG. 35.

FIGS. 33 and 35 show the optical lens arrangements at the low and high magnifications, respectively, and FIGS. 34A–34D and 36A–36D show the various aberrations thereof.

Table 7 below shows lens data of the 7th example.

TABLE 7

| No. | r | D | n | ν |
|---|---|---|---|---|
| 1 | ∞ | 1.80 | 1.49176 | 57.4 |
| 2 | ∞ | 3.78 (WIDE) ~3.04 (TELE) | — | |
| 3* | −24.990 | 1.30 | 1.58547 | 29.9 |
| 4 | 29.400 | 18.14 (WIDE) ~1.60 (TELE) | — | |
| 5* | 18.552 | 1.86 | 1.49176 | 57.4 |
| 6 | −8.254 | 0.79 | — | |
| 7 | −7.523 | 1.17 | 1.58547 | 29.9 |
| 8* | −10.946 | 12.54 (WIDE) ~29.81 (TELE) | — | |
| 9 | 14.382 | 3.00 | 1.49176 | 57.4 |
| 10* | −31.298 | 4.00 | — | |
| 11 | −100.000 | 3.00 | 1.58547 | 29.9 |
| 12 | ∞ | 4.27 | — | |
| 13 | ∞ | 21.80 | 1.49176 | 57.4 |
| 14 | ∞ | 1.90 | — | |
| 15* | 24.937 | 2.60 | 1.49176 | 57.4 |
| 16 | −18.209 | 1.40 | — | |
| 17 | 9.996 | 1.40 | 1.49176 | 57.4 |
| 18 | 9.364 | — | — | |

Note "*" represents the aspheric surface.

Aspheric Lens Data

No. 3: $A4=0.50894\times 10^{-4}$, $A6=0.45595\times 10^{-6}$, $A8=-0.38483\times 10^{-7}$
No. 5: $A4=-0.31084\times 10^{-3}$, $A6=-0.32481\times 10^{-5}$, $A8=0.92696\times 10^{-8}$
No. 8: $A4=-0.15296\times 10^{-3}$, $A6=-0.33729\times 10^{-6}$, $A8=-0.21648\times 10^{-6}$
No. 10: $A4=0.20670\times 10^{-3}$, $A6=-0.17800\times 10^{-5}$
No. 15: $A4=-0.65328\times 10^{-4}$, $A6=-0.12156\times 10^{-7}$

Embodiment 8 (8th example)

Figure 37:
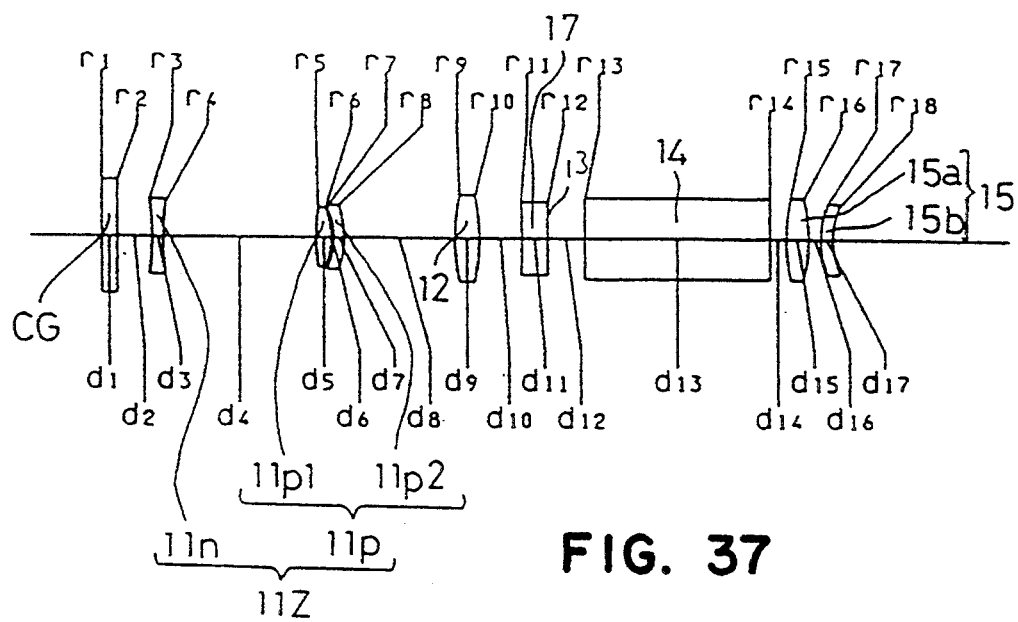
FIG. 37 is a diagram of an optical arrangement of an eighth embodiment of a real image type of variable power view finder at a small magnification, according to the present invention.
Figures 38A, 38B, 38C, 38D:
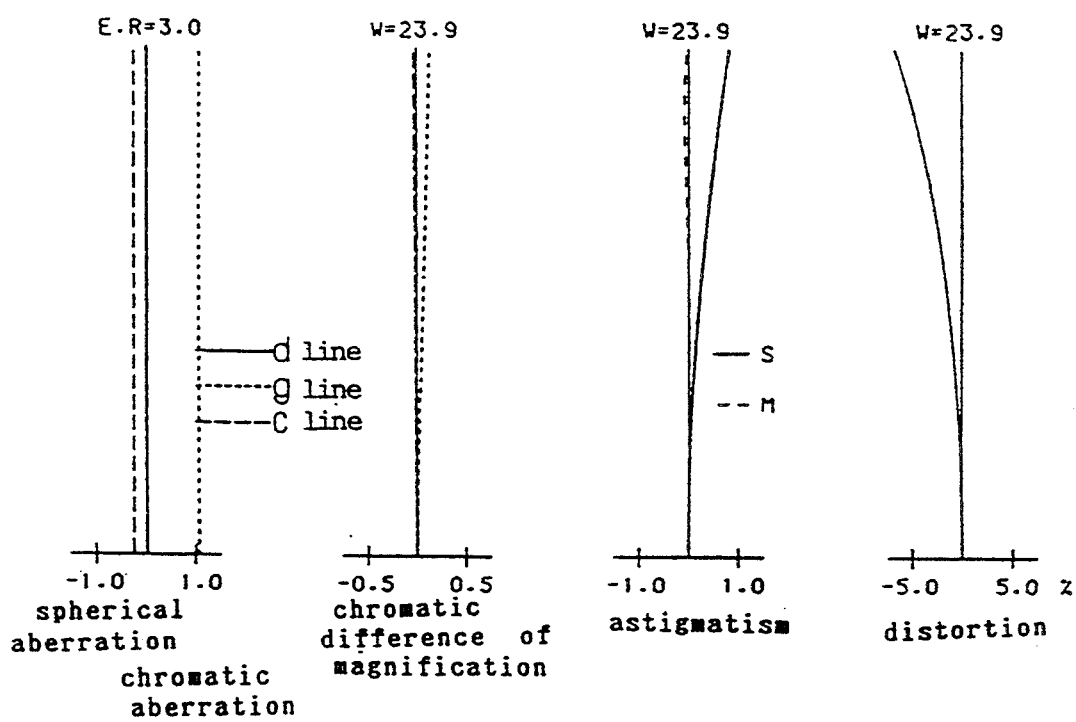
FIGS. 38A–38D show diagrams of aberrations of the view finder shown in FIG. 37.
Figure 39:
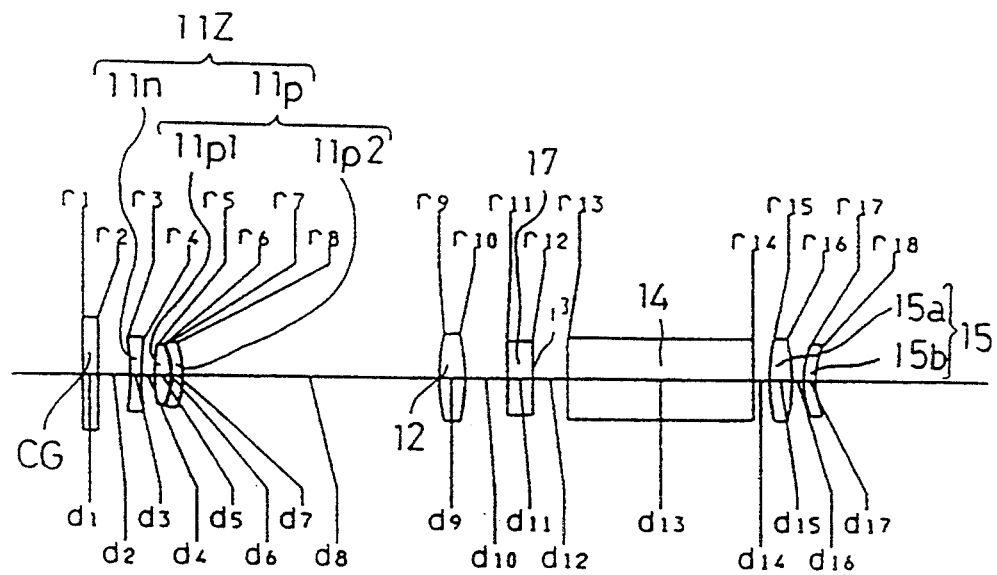
FIG. 39 is a diagram of an optical arrangement of an eighth embodiment of a real image type of variable power view finder at a large magnification, according to the present invention; and, FIGS. 40A–40D show diagrams of aberrations of the view finder shown in FIG. 39.
Figures 40A, 40B, 40C, 40D:
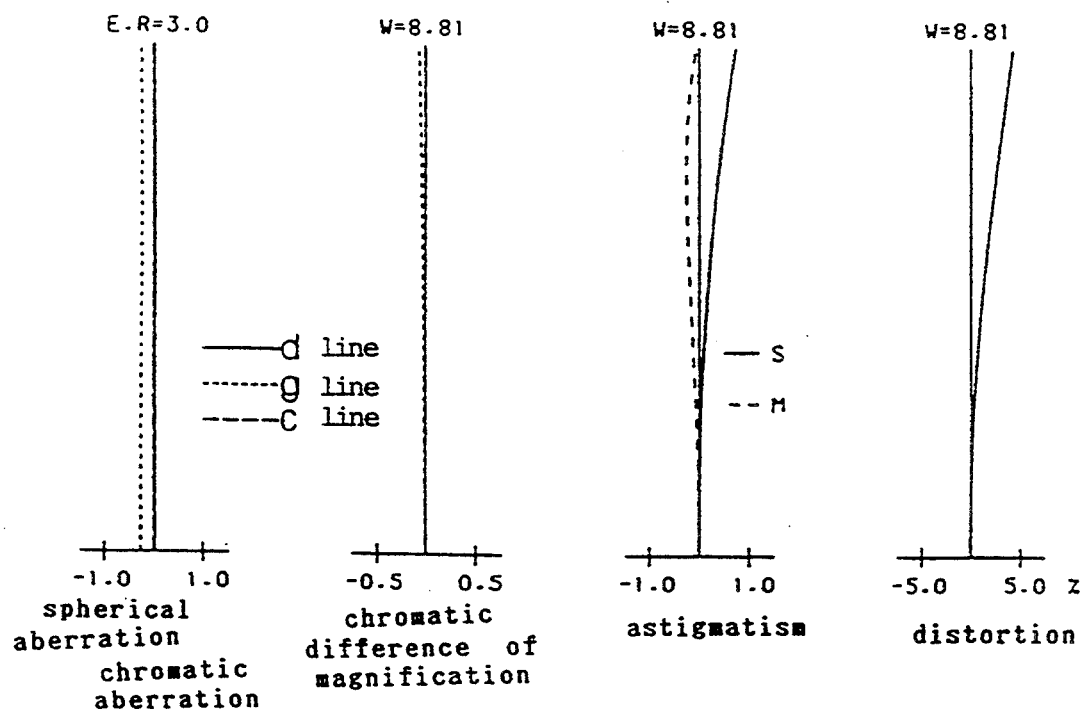

FIGS. 37 and 39 show the optical lens arrangements at the low and high magnifications, respectively, and FIGS. 38A–38D and 40A–40D show the various aberrations thereof.

Table 8 below shows lens data of the 8th example.

TABLE 8

| No. | r | D | n | ν |
|---|---|---|---|---|
| 1 | ∞ | 1.80 | 1.49176 | 57.4 |
| 2 | ∞ | 4.13 (WIDE) ~3.79 (TELE) | — | |
| 3* | −26.952 | 1.30 | 1.58547 | 29.9 |
| 4 | 31.709 | 18.17 (WIDE) ~1.59 (TELE) | — | |
| 5* | 19.271 | 1.85 | 1.49176 | 57.4 |
| 6 | −8.160 | 0.26 | — | |
| 7 | −7.544 | 1.17 | 1.58547 | 29.9 |
| 8* | −11.492 | 13.06 (WIDE) ~29.98 (TELE) | — | |
| 9 | 20.923 | 3.00 | 1.49176 | 57.4 |
| 10* | −17.978 | 5.00 | — | |
| 11 | −100.000 | 3.00 | 1.58547 | 29.9 |
| 12 | ∞ | 4.27 | — | |
| 13 | ∞ | 21.80 | 1.49176 | 57.4 |
| 14 | ∞ | 1.90 | — | |
| 15* | 19.241 | 2.60 | 1.49176 | 57.4 |
| 16 | −20.210 | 1.40 | — | |
| 17 | 9.995 | 1.40 | 1.49176 | 57.4 |
| 18 | 8.862 | — | — | |

Note "*" represents the aspheric surface.

Aspheric Lens Data

No. 3: $A4=0.48659\times 10^{-4}$, $A6=0.11279\times 10^{-7}$, $A8=-0.28354\times 10^{-7}$
No. 5: $A4=-0.24650\times 10^{-3}$, $A6=0.59241\times 10^{-5}$, $A8=-0.31984\times 10^{-6}$
No. 8: $A4=-0.11731\times 10^{-3}$, $A6=0.54283\times 10^{-5}$, $A8=-0.36295\times 10^{-6}$
No. 10: $A4=0.21658\times 10^{-3}$, $A6=-0.14906\times 10^{-5}$
No. 15: $A4=-0.73340\times 10^{-4}$, $A6=0.10312\times 10^{-6}$ Table 9 below shows examples of the distance "s" of the condenser lens group 12, the thickness "T" of the field flattener 17 (or the thickness "t" of the plane-parallel plate 16), the resultant focal length $f_{OW}$ of the shortest focal length of the variable power objective lens group and the focal length of the condenser lens group, and the focal length $f_e$ of the eyepiece group 15.

TABLE 9

| | s | T or t | $f_{ow}$ | $f_e$ |
|---|---|---|---|---|
| Example 1 | 6.798 | 2.208 | 9.711 | 20.66 |
| Example 2 | 6.798 | 2.208 | 9.849 | 20.96 |
| Example 3 | 6.798 | 2.208 | 9.888 | 21.50 |
| Example 4 | 7.772 | 2.028 | 9.601 | 20.87 |
| Example 5 | 6.798 | 2.208 | 9.711 | 20.66 |
| Example 6 | 6.798 | 2.208 | 9.888 | 21.04 |
| Example 7 | 7.903 | 1.892 | 9.193 | 21.38 |
| Example 8 | 8.903 | 1.892 | 9.593 | 20.85 |

From the numerical values shown in Table 9 above, the values of $T/f_e$ and $t/f_e$ are obtained as follows (Table 10). The values of $\phi/\phi_{OB}$ are also shown in Table 10.

TABLE 10

| | $s/f_{ow}$ | $T/f_e$ | $t/f_e$ | $\phi/\phi_{OB}$ |
|---|---|---|---|---|
| Example 1 | 0.700 | 0.107 | — | 1.46 |
| Example 2 | 0.690 | 0.105 | — | 1.50 |
| Example 3 | 0.688 | 0.103 | — | 1.48 |
| Example 4 | 0.809 | 0.097 | — | 1.64 |
| Example 5 | 0.700 | — | 0.107 | 1.34 |
| Example 6 | 0.688 | — | 0.105 | 1.33 |
| Example 7 | 0.860 | — | 0.088 | 1.33 |
| Example 8 | 0.928 | — | 0.091 | 1.61 |

These values satisfy the conditions defined by $0.65 < s/f_{OW} < 1.2$ and $T/f_e > 0.07$ (or $t/f_e > 0.07$).

Table 11 below shows the results of the sensitivity of the parallax adjustment represented by $\{(m'-m)\times 1\text{ mm}\}$ when the displacement (offset) from the optical axis by 1 mm takes place for each of the negative lens groups 11n and the positive lens group 11p of the objective lens group 11 and the lenses of the condenser lens group 12. Table 11 corresponds to FIG. 7. The values "m" of the negative lens group 11n and the positive lens group 11p represent the resultant magnification of the associated lens group (negative lens group 11n or positive lens group 11p) and the optical elements located between the associated lens group and the primary image formation plane 13, similarly to those of the condenser lens group 12. Similarly, the values "m'" of the negative lens group 11n and the positive lens group 11p represent the resultant magnification of the optical elements located between the associated lens group (negative lens group 11n or positive lens group 11p) and the primary image formation plane 13, other than the associated lens group. The sensitivity of the parallax error correction increases as the absolute values of "m" and "m'" increase.

TABLE 11

| Lens Group | | $11_n$ | $11_p$ | 12 |
|---|---|---|---|---|
| Example 1 | WIDE | −0.427 | 1.112 | 0.381 |
| | TELE | −1.803 | 1.773 | 0.381 |
| Example 2 | WIDE | −0.421 | 1.091 | 0.400 |
| | TELE | −1.067 | 1.742 | 0.400 |
| Example 3 | WIDE | −0.415 | 1.090 | 0.378 |
| | TELE | −1.071 | 1.751 | 0.378 |
| Example 4 | WIDE | −0.377 | 0.988 | 0.375 |
| | TELE | −0.976 | 1.592 | 0.375 |
| Example 5 | WIDE | −0.467 | 1.216 | 0.254 |
| | TELE | −1.186 | 1.940 | 0.254 |
| Example 6 | WIDE | −0.471 | 1.225 | 0.249 |
| | TELE | −1.183 | 1.943 | 0.249 |
| Example 7 | WIDE | −0.401 | 1.055 | 0.360 |
| | TELE | −1.089 | 1.749 | 0.360 |
| Example 8 | WIDE | −0.387 | 1.010 | 0.392 |
| | TELE | −0.993 | 1.620 | 0.392 |

Table 12 below shows data of the magnification of the finder, the real field of view (2 ω), the eye relief (mm), the eye ring (mm), and the diopter (3 m) for the eight examples. "Eye ring" is defined as being the diameter of the iris of an observor and is assumed to be a constant 3

TABLE 12

| | | magnification of finder | real field of view | eye relief [mm] | eye ring [mm] | diopter [dpt] |
|---|---|---|---|---|---|---|
| Exa. 1 | WIDE | 0.47 | 47.8 | 12.0 | 3.0 | −0.99 |
| | TELE | 1.18 | 17.8 | 12.0 | 3.0 | −0.99 |
| Exa. 2 | WIDE | 0.47 | 48.2 | 12.0 | 3.0 | −1.00 |
| | TELE | 1.20 | 17.9 | 12.0 | 3.0 | −1.00 |
| Exa. 3 | WIDE | 0.46 | 48.0 | 12.3 | 3.0 | −0.99 |
| | TELE | 1.19 | 17.5 | 12.3 | 3.0 | −0.99 |
| Exa. 4 | WIDE | 0.46 | 48.0 | 12.7 | 3.0 | −1.01 |
| | TELE | 1.20 | 17.6 | 12.7 | 3.0 | −1.01 |
| Exa. 5 | WIDE | 0.47 | 47.8 | 12.0 | 3.0 | −0.98 |
| | TELE | 1.18 | 17.8 | 12.0 | 3.0 | −0.98 |
| Exa. 6 | WIDE | 0.47 | 47.8 | 12.9 | 3.0 | −0.99 |
| | TELE | 1.18 | 17.8 | 12.9 | 3.0 | −0.99 |
| Exa. 7 | WIDE | 0.43 | 47.8 | 13.4 | 3.0 | −0.99 |
| | TELE | 1.18 | 16.5 | 13.4 | 3.0 | −0.99 |
| Exa. 8 | WIDE | 0.46 | 47.8 | 12.2 | 3.0 | −0.99 |
| | TELE | 1.18 | 17.6 | 12.2 | 3.0 | −0.99 |

As can be understood from the above discussion, according to the present invention, aberrations can be precisely corrected, even in a real image type of small view finder having a high variable power. Furthermore, according to the present invention, the parallax error correction upon assembly of the view finder can be easily and reliably effected.

We claim:
1. A real image type of view finder comprising:
   a positive objective lens group;
   a positive condenser lens group;
   an image erecting optical system that erects an inverted image formed by said objective lens group and said condenser lens group; and
   an eyepiece lens group through which said erected image is observed,
   wherein said condenser lens group is spaced at a predetermined distance from an image forming plane in a direction of said objective lens group,
   said inverted image being formed on said image forming plane,
   said image forming plane being provided at the eyeside of said condenser lens group,
   said predetermined distance satisfying the following relationship: $0.65 < s/f_{OW} < 1.2$
   wherein "s" designates a reduced distance between said image forming plane and a first lens surface of said condenser lens group nearest an object to be photographed, said reduced distance defined to be (d/n) wherein "d" represents a distance a ray travels in a medium and "n" the refractive index of said medium; and "$f_{OW}$" a resultant focal length of said objective lens group and said condenser lens group.

2. The real image type of view finder of claim 1, wherein said objective lens group comprises negative and positive lens groups that are movable in an optical axis direction and which constitute a variable power optical system, said negative lens group being located nearest an object side.

3. The real image type of view finder of claim 1, wherein said objective lens group is constituted by a variable power objective lens group, and wherein said "$f_{OW}$" designates a resultant focal length of a shortest focal length thereof and a focal length of said condenser lens group.

4. The real image type of view finder of claim 1, further comprising:
   a plane-parallel plate having one surface that lies in said image forming plane.

5. The real image type of view finder of claim 4, wherein said plane-parallel plate has a reduced thickness "t" that satisfies the following relationship: $t/f_e > 0.07$
   wherein "$f_e$" designates a focal length of said eyepiece lens group, said reduced thickness defined to be (1/n) wherein "1" represents the length of a distance a ray travels in said plane-parallel plate and "n" the refractive index of said plane-parallel plate.

6. The real image type of view finder of claim 1, further comprising:
   a field flattener between said condenser lens group and said image forming plane for correcting a curvature of field caused by said objective lens group and said condenser lens group.

7. The real image type of view finder of claim 6, wherein said field flattener satisfies the following relationship: $-0.7 < f_{co}/f_{FF} < 0$
   wherein $f_{co}$ designates a focal length of said condenser lens group, and $f_{FF}$ a focal length of said field flattener, respectively.

8. The real image type of view finder of claim 6, wherein said field flattener comprises an aspheric lens having a negative power at a peripheral portion thereof and satisfies the following relationship:

$$-0.7 < f_{co}/f_{FF} < 0.3$$

wherein $f_{co}$ designates a focal length of said condenser lens group, and $f_{FF}$ a focal length of said field flattener.

9. The real image type of view finder of claim 6, wherein said field flattener is provided with one substantially flat surface which lies in said image forming plane.

10. The real image type of view finder of claim 9, wherein said field flattener has a reduced thickness "T" which satisfies the following relationship: $T/f_e > 0.07$ wherein "$f_e$" designates a focal length of said eyepiece lens group.

11. The real image type of view finder of claim 1, wherein said condenser lens group is at least partially movable in directions perpendicular to said optical axis.

12. The real image type of view finder of claim 11, further comprising:

actuating means for moving said condenser lens group in directions perpendicular to said optical axis.

13. The real image type of view finder of claim 1, wherein said objective lens group comprises a variable power optical system which is at least partially movable in directions perpendicular to said optical axis.

14. The real image type of view finder of claim 13, wherein said condenser lens group is at least partially movable in directions perpendicular to said optical axis, independently of said objective lens group.

15. The real image type of view finder of claim 1, further the following relationship is satisfied:

$$1.36 \leq \phi/\phi_{OB} < 1.8$$

wherein "$\phi$" designates a resultant power of said objective lens group and said condenser lens group; and "$\phi_{OB}$" a power of said objective lens group.

16. The real image type of view finder of claim 15, wherein a focal length of said objective lens group varies, and wherein said resultant power is a resultant power of said objective lens group and said condenser lens group at a smallest magnification, and said power is a power of said objective lens group at a smallest magnification.

* * * * *